United States Patent
Hosotani

(10) Patent No.: US 10,566,840 B2
(45) Date of Patent: Feb. 18, 2020

(54) WIRELESS POWER FEEDING SYSTEM

(71) Applicant: MURATA MANUFACTURING CO., LTD., Kyoto-fu (JP)

(72) Inventor: Tatsuya Hosotani, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 544 days.

(21) Appl. No.: 15/481,109

(22) Filed: Apr. 6, 2017

(65) Prior Publication Data

US 2017/0214278 A1    Jul. 27, 2017

Related U.S. Application Data

(63) Continuation of application No. PCT/JP2015/074329, filed on Aug. 28, 2015.

(30) Foreign Application Priority Data

Nov. 17, 2014 (JP) ................. 2014-232861

(51) Int. Cl.
```
H02J 50/12      (2016.01)
H02J 50/40      (2016.01)
H02J 7/02       (2016.01)
H02J 50/70      (2016.01)
H02J 50/50      (2016.01)
```
(52) U.S. Cl.
CPC .............. *H02J 50/12* (2016.02); *H02J 7/025* (2013.01); *H02J 50/70* (2016.02); *H02J 50/40* (2016.02); *H02J 50/50* (2016.02)

(58) Field of Classification Search
CPC .. H02J 50/12; H02J 50/70; H02J 7/025; H02J 50/50; H02J 50/40
USPC .......................................... 307/104; 320/108
See application file for complete search history.

(56) References Cited

U.S. PATENT DOCUMENTS

| | | | |
|---|---|---|---|
| 2001/0012208 A1* | 8/2001 | Boys .............. | H02J 5/005 363/23 |
| 2011/0101790 A1* | 5/2011 | Budgett .......... | H05B 6/08 307/104 |

FOREIGN PATENT DOCUMENTS

| | | |
|---|---|---|
| JP | 2011-045151 A | 3/2011 |
| JP | 2013-038634 A | 2/2013 |
| WO | 2013/058174 A1 | 4/2013 |
| WO | 2013/133028 A1 | 9/2013 |

OTHER PUBLICATIONS

International Search Report issued in PCT/JP2015/074329; dated Nov. 2, 2015.
Written Opinion issued in PCT/JP2015/074329; dated Nov. 2, 2015.
International Preliminary Report on Patentability issued in PCT/JP2015/074329; dated May 23, 2017.

* cited by examiner

*Primary Examiner* — Rexford N Barnie
*Assistant Examiner* — Thai H Tran
(74) *Attorney, Agent, or Firm* — Studebaker & Brackett PC

(57) ABSTRACT

When a resonant frequency of a power transmission-side resonance mechanism is expressed by fra, a switching frequency of a first switch circuit and a second switch circuit is expressed by fs, and a resonant frequency of the power transmission-side resonance mechanism and a capacitor of the first switch circuit or the second switch circuit is expressed by frb, a relation of fra<fs≤frb is satisfied.

21 Claims, 20 Drawing Sheets

$i_r$ : 2A/div. , $v_{ds}$ : 20V/div. , time : 50ns/div.

$v_{gs}$:5V/div. $i_r$:2A/div. ,$v_{ds}$:20V/div.

$v_{gs}$:5V/div. $i_r$:1A/div. ,$v_{ds}$:20V/div.

$v_{gs}$:5V/div. $i_r$:10A/div. ,$v_{ds}$:20V/div.

$v_{gs}$:5V/div. $i_r$:1A/div., $v_{ds}$:20V/div.

$v_{gs}$:5V/div. $i_r$:1A/div., $v_{ds}$:20V/div.

$v_{gs}$:5V/div. $i_r$:10A/div., $v_{ds}$:20V/div.

WIRELESS POWER FEEDING SYSTEM

CROSS REFERENCE TO RELATED APPLICATIONS

This application claims benefit of priority to Japanese Patent Application 2014-232861 filed, Nov. 17, 2014, and to International Patent Application No. PCT/JP2015/074329 filed Aug. 28, 2015, the entire content of which is incorporated herein by reference.

TECHNICAL FIELD

The present disclosure relates to a wireless power feeding system configured by a power transmission unit including a power transmission coil and a power receiving unit including a power receiving coil.

BACKGROUND

Research and development for reducing power loss of an overall system have been accelerated in order to put wireless power feeding into practical use. In particular, a power feeding system called "direct-current (DC)-Resonance" is a system that causes resonance of an electromagnetic field to occur from DC to convert energy of electricity and energy of the electromagnetic field. A resonance field is created by intermittently applying DC electricity to a resonance mechanism to cause a power transmission resonance mechanism and a power receiving resonance mechanism to interact with each other for resonance. A DC resonance wireless power feeding system can reduce power loss by simplifying a power feeding process unlike an existing system of applying a high-frequency magnetic field to a resonator.

For example, International Publication No. 2013/133028 discloses a system of causing electromagnetic field resonance to occur from a DC voltage and wirelessly feeding electric power. The wireless power feeding system disclosed in International Publication No. 2013/133028 includes resonance mechanisms at both of a power transmission side and a power reception side and a resonant current flows through the resonance mechanisms. Furthermore, a switching element is turned ON/OFF to cause an AC current to flow through the resonance mechanisms and can be made to perform a zero voltage switching (ZVS) operation. In the case of employing a dual-transistor push-pull type, electric power can be supplied to the power reception side from the power transmission side by causing the AC current to flow through the resonance mechanisms from DC electricity in both of an ON period and an OFF period.

SUMMARY

Technical Problem

In recent years, a market demand for increase in efficiency of a switching power supply circuit has been further enhanced with reduction of electronic apparatuses in size and weight. In general, in order to increase the efficiency of the switching power supply circuit, it is important to increase accuracy of switching control. However, an advanced switching control technique for providing high power conversion efficiency has been hardly proposed in a technical field called high-frequency power electronics with an operation frequency of a MHz band. For example, in a wireless power feeding system adopting a class-E inverter, a system design manner capable of converting energy of electricity and energy of the electromagnetic field by causing electromagnetic field resonance to occur while reducing conduction loss and switching loss of a switching element and suppressing heat generation of the switching element to increase power conversion efficiency in the system has been hardly proposed so far. In particular, the wireless power feeding system adopting the class-E inverter has usefulness that only a single field-effect transistor (FET) can configure the system to achieve the simple system reduced in size and weight. In the wireless power feeding system adopting the push-pull class-E inverter, two FETs are alternately turned ON and OFF and ground potentials of these two FETs can be connected to the ground at the same potential, thereby providing usefulness that the FETs are driven easily. On the other hand, in the wireless power feeding system adopting the class-E inverter, it is highly difficult to design the wireless power feeding system providing high power conversion efficiency because a capacitor which is equivalently connected to the switching element in parallel is involved as an element of the resonance mechanism. This is because a resonant frequency determined by the resonance mechanism discretely varies based on ON and OFF of the switching element. To be more specific, the resonance mechanism having the resonant frequency that differs between the ON period and the OFF period is formed. The wireless power feeding technique of feeding electric power to a power receiving unit from a power transmission unit beyond a space is highly required to be increased in efficiency and reduced in size and weight, and development of a system design technique for providing high energy conversion efficiency and high power conversion efficiency is an important technique capable of contributing to development of scientific technologies and growth of the industry.

An object of the present disclosure is to provide a wireless power feeding system adopting a class-E inverter, which causes resonance of an electromagnetic field to occur from DC to convert energy of electricity and energy of the electromagnetic field, causes a power transmission resonance mechanism and a power receiving resonance mechanism to interact with each other for resonance, and enables a switching element to accurately perform an optimum ZVS operation capable of reducing conduction loss and switching loss to further increase power conversion efficiency.

Solution to Problem

A wireless power feeding system according to an aspect of the disclosure is configured as follows.

(1) A wireless power feeding system is configured by a power transmission unit including a power transmission coil and a power receiving unit including a power receiving coil, and feeds electric power to the power receiving unit from the power transmission unit, wherein the power transmission unit includes a power transmission-side resonant capacitor configuring a power transmission-side resonance mechanism together with the power transmission coil, a first power transmission-side alternating-current (AC) current generation circuit which is electrically connected to one of the power transmission-side resonance mechanism, a second power transmission-side AC current generation circuit which is electrically connected to the other of the power transmission resonance mechanism, and a switching control circuit, the first power transmission-side AC current generation circuit includes a first switch circuit which is equivalently configured by a parallel connection circuit of a switching element, a diode, and a capacitor, and a first inductor having an inductance which generates, from an input DC voltage, a current source capable of being regarded as a DC current relatively to an AC current flowing through the power transmission-side resonance mechanism, the second power transmission-side AC current generation circuit includes a second switch circuit which is equivalently configured by a parallel connection circuit of a switching element, a diode, and a capacitor, and a second inductor having an inductance which generates, from the input DC voltage, a current source capable of being regarded as a DC current relatively to an AC current flowing through the power transmission-side resonance mechanism, the switching control circuit generates the AC current in the power transmission coil from the first power transmission-side AC voltage generation circuit and the second power transmission-side AC voltage generation circuit by alternately turning ON and OFF the switching element of the first switch circuit and the switching element of the second switch circuit, the power receiving unit includes a power reception-side resonant capacitor configuring a power reception-side resonance mechanism together with the power receiving coil, and a power reception-side rectifying circuit which is electrically connected to the power receiving coil and rectifies an AC current generated in the power receiving coil, a first resonant frequency which is determined by the power transmission-side resonance mechanism is lower than a switching frequency of the first switch circuit and the second switch circuit, a second resonant frequency which is determined by the power transmission-side resonance mechanism and the capacitor of the first switch circuit or the second switch circuit is higher than the switching frequency, and the switching control circuit switches the switching elements of the first switch circuit and the second switch circuit at a switching frequency at which a first impedance when a load side is observed from both ends of one switch circuit of the first switch circuit and the second switch circuit with the power transmission-side resonance mechanism interposed therebetween in a state in which the other switch circuit is short-circuited without involving a capacitance of the one switch circuit is an inductive impedance and switches the switching elements of the first switch circuit and the second switch circuit at a switching frequency at which a second impedance when the load side is observed from both ends of one switch circuit of the first switch circuit and the second switch circuit with the power transmission-side resonance mechanism interposed therebetween in a state in which the other switch circuit is short-circuited while involving the capacitance of the one switch circuit is an inductive impedance to make each of both-end voltages of the first switch circuit and the second switch circuit have a half sine wave-like waveform for each half period, and an equivalent electromagnetic field resonance coupling circuit is configured by a mutual inductance or a mutual capacitance which is equivalently formed between the power transmission coil and the power receiving coil to cause the power transmission-side resonance mechanism and the power reception-side resonance mechanism to resonate.

The above-described configuration provides the following effects.

(a) The equivalent electromagnetic field resonance coupling circuit is configured to cause the power transmission unit-side resonance mechanism and the power receiving unit-side resonance mechanism to resonate. With this, electric power can be fed to the power receiving unit from the power transmission unit beyond a space and electromagnetic field resonance occurs from the DC voltage to feed electric power. Furthermore, the switching elements can perform a zero voltage switching (ZVS) operation, thereby largely reducing switching loss. The wireless power feeding system can be increased in efficiency, reduced in size and weight, and increased in reliability.

(b) The electromagnetic field resonance is caused to occur between the power transmission coil and the power receiving coil to feed electricity beyond a space. Therefore, electric power can be fed with higher power efficiency than that of electromagnetic induction type power feeding. Furthermore, the power feeding is performed using not only magnetic field resonance coupling but also electric field resonance coupling, thereby supplying electric power with higher power efficiency than that in the case of power feeding using only the magnetic field resonance coupling.

(c) The switching operation is performed complementarily using the two switching elements. Therefore, harmonic current components in a waveform of a resonant current flowing through the resonance mechanisms are few, thereby reducing unnecessary radiation noise.

(2) A wireless power feeding system is configured by a power transmission unit including a power transmission coil and a power receiving unit including a power receiving coil, and feeds electric power to the power receiving unit from the power transmission unit, wherein the power transmission unit includes a power transmission-side resonant capacitor configuring a power transmission-side resonance mechanism together with the power transmission coil, a first power transmission-side AC current generation circuit which is electrically connected to the power transmission-side resonance mechanism, and a switching control circuit, the first power transmission-side AC current generation circuit includes a first switch circuit which is equivalently configured by a parallel connection circuit of a switching element, a diode, and a capacitor, and a first inductor having an inductance which generates, from an input DC voltage, a current source capable of being regarded as a DC current relatively to an AC current flowing through the power transmission-side resonance mechanism, the switching control circuit generates the AC current in the power transmission coil from the power transmission-side AC voltage generation circuit by turning ON and OFF the switching element of the first switch circuit, the power receiving unit includes a power reception-side resonant capacitor configuring a power reception-side resonance mechanism together with the power receiving coil, and a power reception-side rectifying circuit which is connected to the power receiving coil and rectifies an AC current generated in the power receiving coil, a first resonant frequency which is determined by the power transmission-side resonance mechanism is lower than a switching frequency of the first switch circuit, a second resonant frequency which is determined by the power transmission-side resonance mechanism and the capacitor of the first switch circuit is higher than the switching frequency, the switching control circuit switches the switching element at a switching frequency at which a first impedance when a load side is observed from both ends of the first switch circuit with the power transmission-side resonance mechanism interposed therebetween without involving a capacitance of the one switch circuit is an inductive impedance and switches the switching element at a switching frequency at which a second impedance when the load side is observed from both ends of the first switch circuit with the resonance mechanism interposed therebetween while involving the capacitance of the one switch circuit is an inductive impedance to make a both-end voltage of the first switch circuit have a half sine wave-like waveform for each half period, and an electromagnetic field resonance coupling circuit is configured by a mutual inductance or a mutual capacitance which is equivalently formed between the power transmission coil and the power receiving coil to cause the power transmission-side resonance mechanism and the power reception-side resonance mechanism to resonate.

With the above-described configuration, the switching element is of a single transistor type and the power transmission unit and the power receiving unit can be simplified.

(3) In the wireless power feeding system according to the above-described item (1), it is preferable that the power transmission-side resonance mechanism include a switching control circuit which makes the first switch circuit or the second switch circuit into conduction after a both-end voltage of the first switch circuit or the second switch circuit from the power transmission coil becomes around 0 V. With this, the ZVS operation is performed to largely reduce switching loss in the switching elements, thereby increasing power efficiency of the wireless power feeding system.

(4) In the wireless power feeding system according to the above-described item (2), it is preferable that the power transmission-side resonance mechanism include a switching control circuit which makes the first switch circuit into conduction after a both-end voltage of the first switch circuit from the power transmission coil becomes around 0 V. With this, the ZVS operation is performed to largely reduce switching loss in the switching element, thereby increasing power efficiency of the wireless power feeding system.

(5) In the wireless power feeding system according to the above-described item (3) or (4), it is preferable that the second resonant frequency frb be set so as to be substantially equal to the switching frequency fs. With this, the switching element is turned off when dvds/dt is 0 and vds is 0 (vds: drain-source voltage) while realizing the ZVS operation, and being turned off with a minimum current, thereby largely reducing the switching loss.

(6) In the wireless power feeding system according to the above-described item (3) or (4), it is preferable that the first resonant frequency fra and the second resonant frequency frb be set for the switching frequency fs so as to substantially satisfy (fra+fs)/2=fs. With this, the switching element is turned off when dvds/dt is 0 and vds is 0 while realizing the ZVS operation, and being turned off with a minimum current, thereby largely reducing the switching loss.

(7) It is preferable that the wireless power feeding system include a filter having an inductor element and a capacitor element between the power transmission-side AC voltage generation circuit and the power transmission-side resonance mechanism. With this, unnecessary radiation that is emitted from the power transmission-side resonance mechanism is reduced to decrease electromagnetic interference noise (EMI), thereby achieving electromagnetic compatibility (EMC) with other electronic apparatuses and the like.

(8) It is preferable that the wireless power feeding system include a filter having an inductor element and a capacitor element between the power reception-side resonance mechanism and the rectifying circuit. With this, unnecessary radiation that is emitted from the power reception-side resonance mechanism is reduced to decrease EMI, thereby achieving EMC with other electronic apparatuses and the like.

(9) It is preferable that the power receiving unit include an output information transmission circuit which detects output information related to output of the power receiving unit-side rectifying circuit and transmits the output information to the power transmission unit, and the power transmission unit include an output information receiving circuit which receives the output information and a feeding power control circuit which controls the power transmission-side AC voltage generation circuit in accordance with the output information to control feeding power. With this, a switching operation is controlled at the power transmission side to adjust feeding power, thereby appropriately operating an electronic apparatus.

(10) It is preferable that the output information transmission circuit be a circuit which transmits the output information by wireless communication and the output information receiving circuit be a circuit which receives the output information by wireless communication. With this, the power transmission unit can adjust output power in an electrically insulated state.

(11) It is preferable that the output information transmission circuit be a circuit which converts an electric signal into an optical signal to transmit the output information, and the output information receiving circuit be a circuit which converts the optical signal into the electric signal to receive the output information. With this, the power transmission unit can adjust the output power in the electrically insulated state.

(12) For example, the switching control circuit controls electric power which is fed to the power receiving unit from the power transmission unit by pulse frequency modulation (PFM) control of changing the switching frequency. With this, feeding power can be controlled, thereby adjusting output power.

(13) For example, the switching control circuit controls electric power which is fed to the power receiving unit from the power transmission unit by PWM control of a time ratio at a constant switching frequency. With this, feeding power can be controlled to adjust output power. Furthermore, a use frequency band can be limited by using the constant switching frequency, thereby easily achieving preferable EMC. Moreover, controllability to control output is enhanced.

(14) It is preferable that the power reception-side rectifying circuit be a synchronous rectifying circuit including a switching element. With this, the power reception-side synchronous rectifying circuit can reduce rectification loss. Therefore, the power feeding system can be reduced in size.

(15) It is preferable that the power receiving unit include an operation frequency control circuit which controls an operation frequency of the synchronous rectifying circuit. With this, supply power can be adjusted not at the power transmission side but at the power reception side by controlling the operation frequency of the synchronous rectifying circuit at the power reception side.

(16) It is preferable that the power receiving unit include a power receiving unit-side control circuit which controls a circuit at the power receiving unit side and the power receiving unit-side control circuit operate with electric power received by the power receiving unit. With this, the control circuit can be made to operate with received power at the power reception side. Furthermore, the unit can be reduced in size and weight without necessity to include a power supply at the power reception side.

(17) It is preferable that the power reception-side rectifying circuit receive electric power from an output portion of the power reception-side rectifying circuit and function as the power transmission-side AC voltage generation circuit, and the power transmission-side AC voltage generation circuit receive electric power from the output portion and function as the power reception-side rectifying circuit. With this, bidirectional power feeding can be performed to feed electric power to the power transmission side from the power reception side and feed received electric power to another place using the power reception side as a relay point. Furthermore, the wireless power feeding system can be used as a relay system to perform long-distance power feeding by preparing a plurality of the systems for relay.

(18) It is preferable that the power transmission coil and the power receiving coil be formed by air-core coils. With this, even when an inductor is configured between the power transmission coil and the power receiving coil, formation of electromagnetic field coupling using electromagnetic resonance enables wireless power feeding to be performed efficiently. Moreover, a power feeding distance can be increased because magnetic cores are not required.

(19) It is preferable that the mutual inductance be an equivalent excitation inductance which is generated by magnetic field resonance coupling formed between the power transmission coil and the power receiving coil. With this, no excitation inductor component is necessary, thereby reducing the power transmission unit and the power receiving unit in size and weight.

(20) It is preferable that the power transmission-side resonance mechanism or the power reception-side resonance mechanism include an inductor, and the inductor be a leakage inductance component which is not involved in coupling in inductance components of the power transmission coil or the power receiving coil. With this, no resonant inductor component is necessary, thereby reducing a power feeding system apparatus in size and weight.

(21) It is preferable that the wireless power feeding system include a single or a plurality of resonance devices which have resonance mechanisms and configure an electromagnetic field resonance coupling circuit together with the power transmission unit and the power receiving unit. With this, electromagnetic field resonance coupling involving the plurality of resonators is formed by installing the plurality of resonators and electric power can be supplied to a predetermined distanced place by appropriately installing the resonators spatially. Furthermore, long-distance power feeding can be performed with high power efficiency.

Advantageous Effects of Disclosure

According to the present disclosure, the following effects can be obtained.

(a) The equivalent electromagnetic field resonance coupling circuit is configured to cause the power transmission unit-side resonance mechanism and the power receiving unit-side resonance mechanism to resonate. With this, electric power can be fed to the power receiving unit from the power transmission unit beyond a space and electromagnetic field resonance occurs from the DC voltage to feed electric power. Furthermore, the switching elements can perform the ZVS operation, thereby largely reducing switching loss. The wireless power feeding system can be increased in efficiency, reduced in size and weight, and increased in reliability.

(b) The electromagnetic field resonance is caused to occur between the power transmission coil and the power receiving coil to feed electricity beyond a space. Therefore, power feeding with higher power efficiency than that of electromagnetic induction type power feeding can be performed. Furthermore, the power feeding is performed using not only magnetic field resonance coupling but also electric field resonance coupling, thereby supplying electric power with higher power efficiency than that in the case of power feeding using only the magnetic field resonance coupling.

DETAILED DESCRIPTION

First Embodiment

Figure 1:
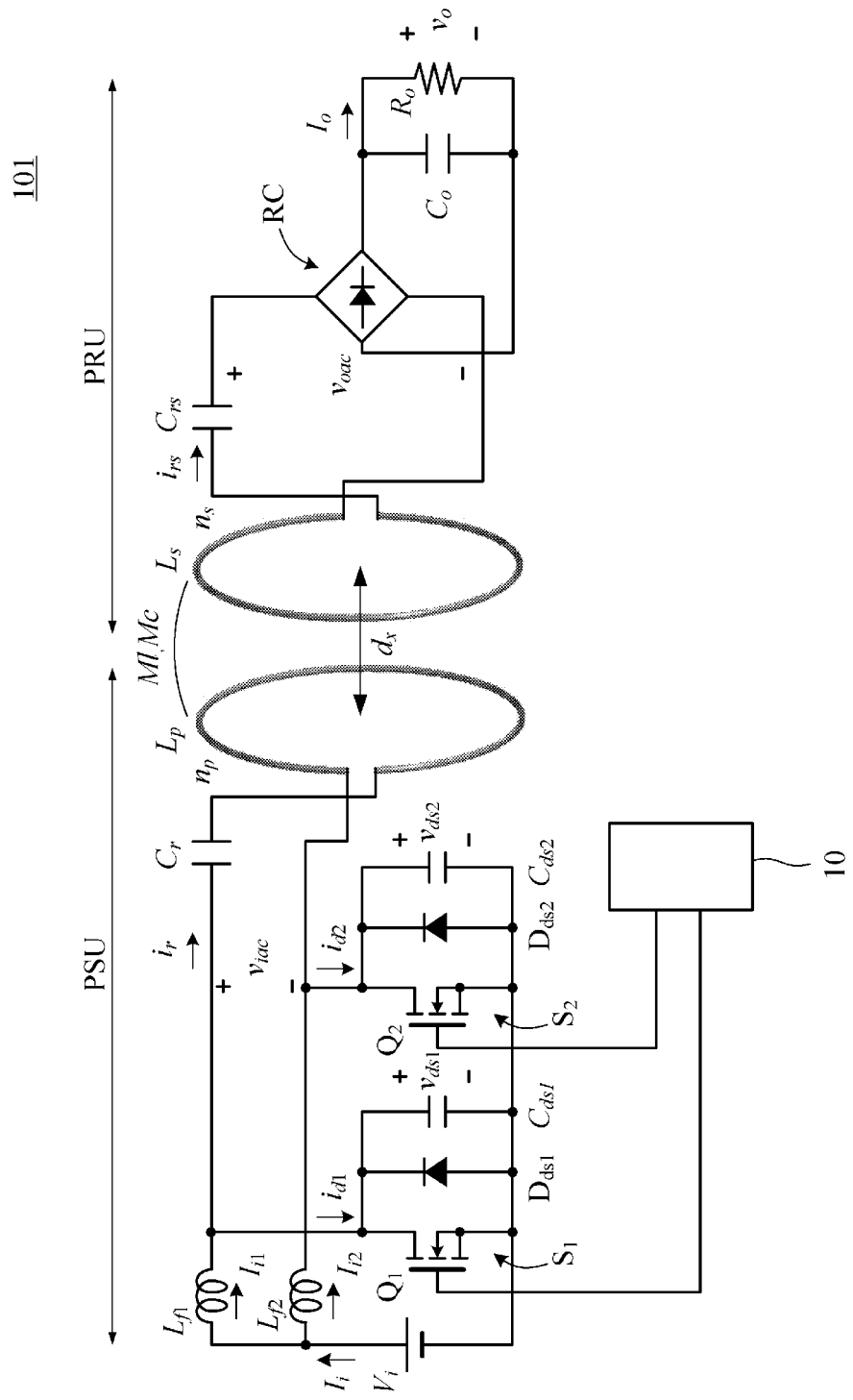
FIG. 1 is a circuit diagram of a wireless power feeding system 101 according to a first embodiment.

FIG. 1 is a circuit diagram of a wireless power feeding system 101 according to a first embodiment.

The wireless power feeding system 101 is configured by a power transmission unit PSU and a power receiving unit PRU.

The wireless power feeding system 101 is a system that is configured by the power transmission unit PSU including a power transmission coil np and the power receiving unit PRU including a power receiving coil ns, includes an input power supply Vi as an input portion of the power transmission unit PSU, and feeds stable DC energy to a load Ro of the power receiving unit PRU.

The power transmission unit PSU includes a power transmission-side resonance mechanism configured by the power transmission coil np and a power transmission-side resonant capacitor Cr, a first power transmission-side AC current generation circuit which is electrically connected to one of the power transmission-side resonance mechanism, a second power transmission-side AC current generation circuit which is electrically connected to the other of the power transmission resonance mechanism, and a switching control circuit 10.

The first power transmission-side AC current generation circuit includes a first switch circuit S1 which is equivalently configured by a parallel connection circuit of a switching element Q1, a diode Dds1, and a capacitor Cds1, and a first inductor Lf1 having an inductance which generates, from an input DC voltage, a current source capable of being regarded as a DC current relatively to an AC current flowing through the power transmission-side resonance mechanism.

The second power transmission-side AC current generation circuit includes a second switch circuit S2 which is equivalently configured by a parallel connection circuit of a switching element Q2, a diode Dds2, and a capacitor Cds2, and a second inductor Lf2 having an inductance which generates, from the input DC voltage, a current source capable of being regarded as a DC current relatively to an AC current flowing through the power transmission-side resonance mechanism.

The switching control circuit 10 generates an AC voltage from the first power transmission-side AC voltage generation circuit and the second power transmission-side AC voltage generation circuit by alternately turning ON and OFF the switching element Q1 of the first switch circuit S1 and the switching element Q2 of the second switch circuit S2.

The power receiving unit PRU includes a power reception-side resonance mechanism which is configured by the power receiving coil ns and a power reception-side resonant capacitor Crs and a power reception-side rectifying circuit RC which is connected to the power receiving coil ns and rectifies an AC current generated in the power receiving coil ns.

Metal oxide semiconductor field effect transistors (MOSFETs) having a breakdown voltage of 60 V and a rated maximum current of 6 A are used for the switching elements Q1 and Q2 and a Schottky barrier diode having a breakdown voltage of 60 V is used for a diode bridge. Medium-high voltage ceramic capacitors excellent in high-frequency characteristics are used for the resonant capacitors Cr, Crs, Cds1, and Cds2. A large-capacitance multilayer ceramic capacitor and a film capacitor which are connected in parallel are used for each of the capacitors which are connected to the input power supply in parallel at the power transmission side and a capacitor Co which smooths an output voltage at the power receiving side.

In the wireless power feeding system 101 in the embodiment, the switching elements Q1 and Q2 are switching elements having parasitic output capacitances and parasitic diodes, such as the MOSFETs, and configure the switch circuits S1 and S2, respectively, using the parasitic output capacitances and the parasitic diodes.

A first resonant frequency fra of the power transmission-side resonance mechanism configured by the power transmission coil np and the power transmission-side resonant capacitor Cr is lower than a switching frequency fs of the first switch circuit S1 and the second switch circuit S2. Furthermore, a second resonant frequency frb defined by the above-described power transmission-side resonance mechanism and the capacitor Cds1 or Cds2 of the first switch circuit S1 or the second switch circuit S2 is higher than the switching frequency fs. Accordingly, a relation of fra<fs≤frb is satisfied.

The switching control circuit 10 switches the first switching element Q1 and the second switching element Q2 at a switching frequency at which a first impedance Za when the load side is observed from both ends of one switch circuit of the first switch circuit S1 and the second switch circuit S2 with the power transmission-side resonance mechanism interposed therebetween in a state in which the other switch circuit is short-circuited without involving a capacitance of the one switch circuit is an inductive impedance and switches the first switching element Q1 and the second switching element Q2 at a switching frequency at which a second impedance Zb when the load side is observed from both ends of one switch circuit of the first switch circuit S1 and the second switch circuit S2 with the power transmission-side resonance mechanism interposed therebetween in a state in which the other switch circuit is short-circuited while involving the capacitance of the one switch circuit is an inductive impedance to make each of both-end voltages of the first switch circuit S1 and the second switch circuit S2 have a half sine wave-like waveform for each half period.

In this manner, an equivalent electromagnetic field resonance coupling circuit is configured by a mutual inductance Ml and a mutual capacitance Mc which are equivalently formed between the power transmission coil np and the power receiving coil ns to cause the power transmission-side resonance mechanism and the power reception-side resonance mechanism to resonate.

Figure 2:
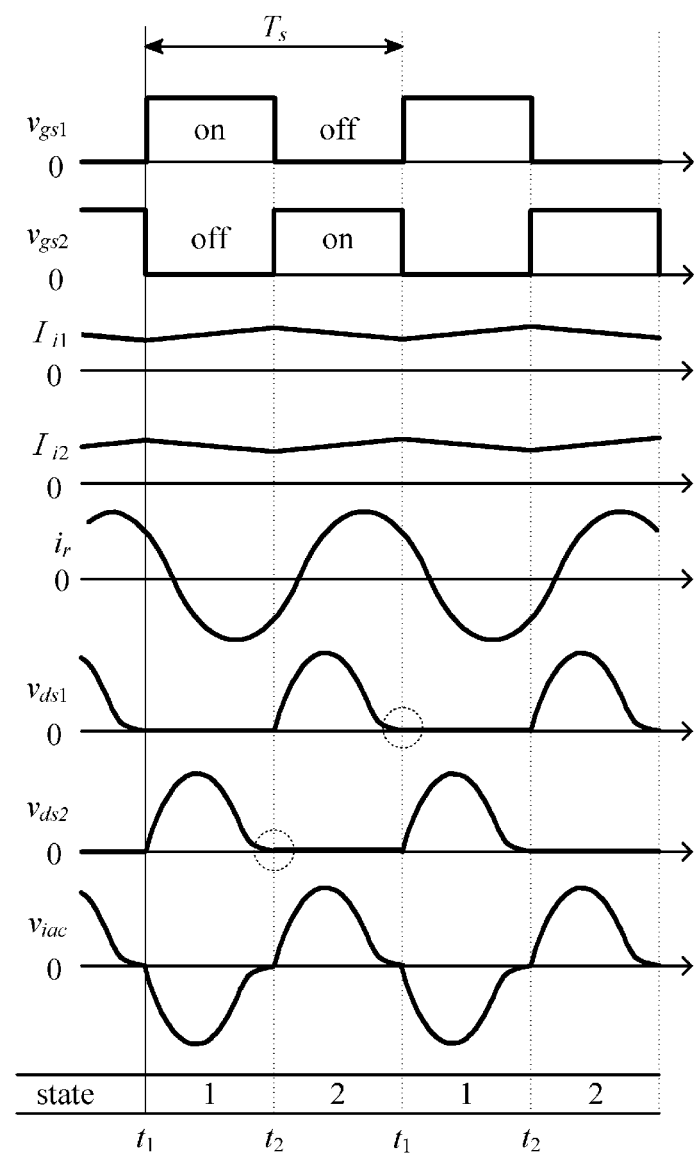
FIG. 2 is a voltage-current waveform chart of respective components of the wireless power feeding system 101 illustrated in FIG. 1.

FIG. 2 is a voltage-current waveform chart of respective components of the wireless power feeding system 101 illustrated in FIG. 1. This example illustrates a basic switching operation waveform with which an optimum ZVS operation is performed in a push-pull class-E wireless power feeding system.

Operations in respective states in a switching period are described below with reference to FIG. 1 and FIG. 2.

Gate-source voltages of the switching elements Q1 and Q2 are expressed by vgs1 and vgs2 and drain-source voltages thereof are expressed by vds1 and vds2, respectively. Furthermore, resonant currents flowing through the resonant capacitors Cr and Crs are expressed by ir and irs, respectively. As is described below, a both-end voltage viac of an LC series resonance circuit configured by the resonant capacitor Cr and the power transmission coil np has a waveform close to sine waves.

In the wireless power feeding system, the following two operation states are established in one switching period Ts.

(a) State 1 (t1≤t<t2)

The state 1 is a period in which the switching element Q1 is in an ON state and the switching element Q2 is in an OFF state. When the switching element Q1 is turned ON, a current Ii2 flowing through the second inductor Lf2 flows through the capacitor Cds2 and the power transmission coil np and the resonant current ir having a sine wave-like waveform flows through the LC series resonance circuit (power transmission-side resonance mechanism) configured by the resonant capacitor Cr and the power transmission coil np. The drain-source voltage vds2 of the switching element Q2 rises from 0 V with a sine wave-like waveform and moderately falls immediately before the switching element Q2 is turned ON. In this period, a current Ii1 flows through the first inductor Lf1 from Vi and magnetic energy is accumulated therein. When the switching element Q1 is turned OFF, a state 2 is established.

(b) State 2 (t2≤t<t1)

The state 2 is a period in which the switching element Q1 is in an OFF state and the switching element Q2 is in an ON state. When the switching element Q2 is turned ON, the current Ii1 flowing through the first inductor Lf1 flows through the capacitor Cds1 and the resonant capacitor Cr, and the current ir has a sine wave-like waveform. The drain-source voltage vds1 of the switching element Q1 rises from 0 V with a sine wave-like waveform and moderately falls immediately before the switching element Q1 is turned ON. In this period, the current Ii2 flows through the second inductor Lf2 from Vi and magnetic energy is accumulated therein. When the switching element Q2 is turned OFF, the state 1 is established.

The state 1 and the state 2 are periodically repeated hereinafter.

In this manner, vds of the switching element Q1 or Q2 becomes 0 immediately before it is turned ON and the parasitic diode Dds is conducted, thereby realizing the ZVS operations. Furthermore, dvds/dt is close to 0 immediately before the switching element Q1 or Q2 is turned ON (at timings indicated by dashed circles in FIG. 2), and vds becomes 0 to realize the ZVS operation whereas an operation close to zero current switching (ZCS) is realized when the switching element Q1 or Q2 is turned OFF. This operation is called the optimum ZVS operation. With the optimum ZVS operation, switching loss is minimum to improve power efficiency in the system.

Various modes can be taken as feeding power control by switching control. One of the modes is pulse frequency modulation (PFM). The feeding power can be controlled by changing the switching frequency to change an amplitude of the resonant current using a characteristic that a synthesized impedance of the dual resonance circuit varies depending on frequencies. Electric power in accordance with a demand of an electronic apparatus can be therefore supplied to cause the electronic apparatus to appropriately operate.

Another switching control is pulse width modulation (PWM) controlling a time ratio at a constant switching frequency. Control of the time ratio of the switching elements enables the feeding power to be controlled, thereby adjusting output power. Furthermore, a use frequency band can be limited by using a constant switching frequency, thereby easily achieving preferable EMC. In addition, controllability for controlling output is enhanced.

It should be noted that received power can also be adjusted not at the power transmission unit PRU side but at the power transmission unit PSU side by controlling an operation frequency of a synchronous rectifying circuit at the power receiving unit PRU side. Larger electric power can be provided by operating the synchronous rectifying circuit in synchronization with the operation frequency at the power transmission unit PSU side. On the other hand, smaller electric power can be handled with suppressed received power by operating the synchronous rectifying circuit while shifting synchronous timing thereof from the operation frequency at the power transmission unit PSU side.

Figure 3A:
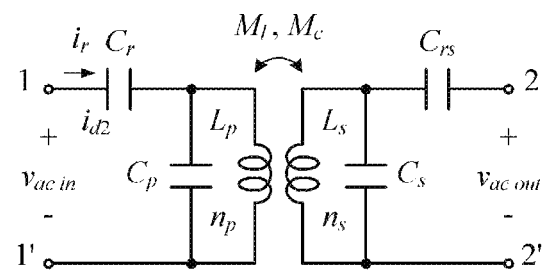
FIG. 3(A) is a circuit diagram of a dual resonance circuit involving equivalent electromagnetic field resonance coupling configured by an electromagnetic field resonance coupling circuit 90 and resonant capacitors Cr and Crs illustrated in FIG. 1.
Figure 3B:
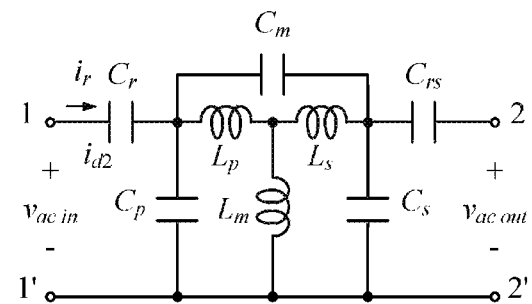
FIG. 3(B) is an equivalent circuit diagram thereof.

FIG. 3(A) is a circuit diagram of the dual resonance circuit involving the equivalent electromagnetic field resonance coupling configured by the electromagnetic field resonance coupling circuit and the resonant capacitors Cr and Crs illustrated in FIG. 1. FIG. 3(B) is an equivalent circuit diagram thereof. A mutual inductance Lm is expressed as an equivalent inductor which transmits electric power by the magnetic field resonance coupling between the power transmission coil np and the power receiving coil ns and a mutual capacitance Cm is expressed as an equivalent capacitor which transmits electric power by the electric field resonance coupling between the power transmission coil np and the power receiving coil ns.

With resonance, an input current iac in (t) to the electromagnetic field resonance coupling circuit can be approximately expressed by the following equation while the amplitude of the resonant current is assumed to be Iac.

$$iac\ in\ (t) = Iac\ \sin(\omega st)$$

wherein $\omega s = 2\pi/Ts$

The sine wave current iac in (t) is applied to between terminals 1 and 1'. Although a current containing frequency components tries to flow between the terminals 1 and 1', the electromagnetic field resonance coupling circuit cuts current waveforms of high-order frequency components causing the impedance to be increased and the resonance operation causes only a resonant current waveform of the switching frequency component to mainly flow, thereby transmitting electric power efficiently.

Next, a relation between settings of the above-described resonant frequencies fra and frb and switching frequency fs and the ZVS operation is described by simulation.

Figure 4:
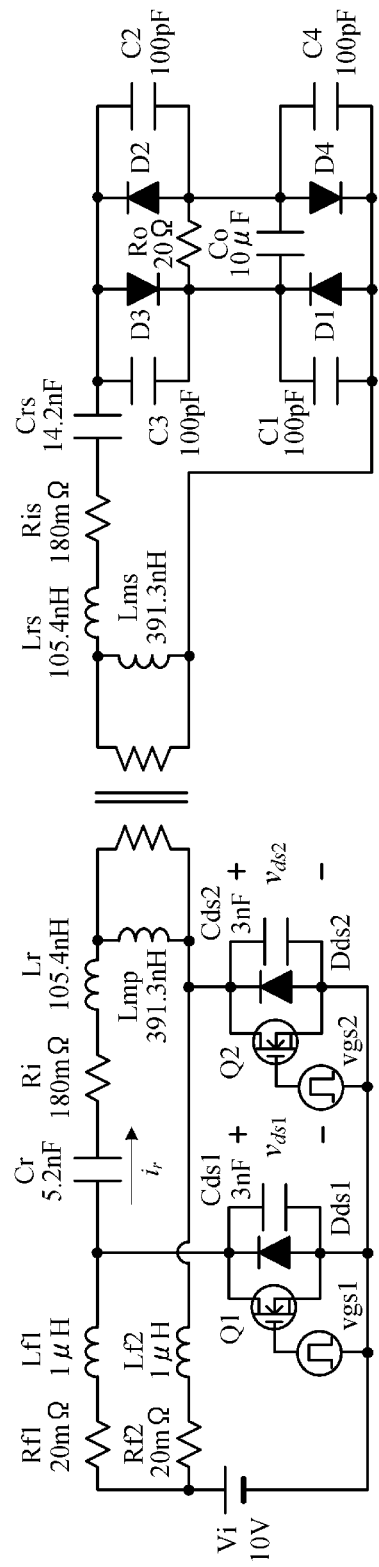
FIG. 4 is a simulation circuit of the wireless power feeding system 101 illustrated in FIG. 1.
Figure 5:
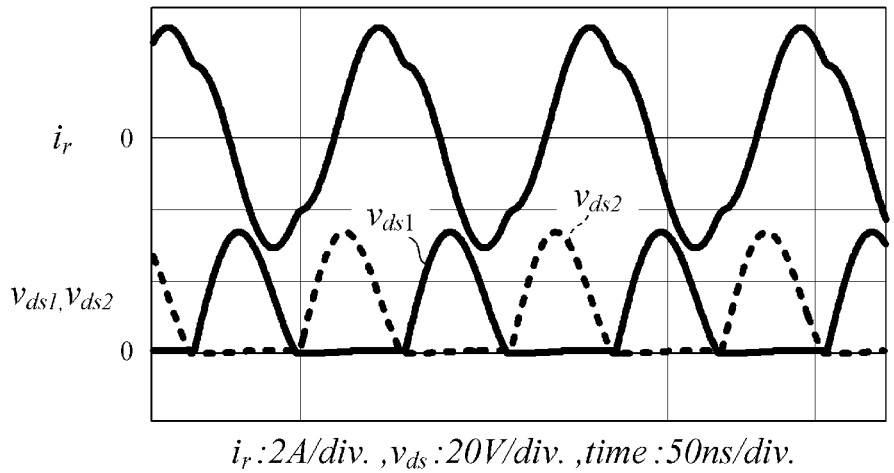
FIG. 5 is a current-voltage waveform chart of respective components in FIG. 4.

FIG. 4 is a simulation circuit of the wireless power feeding system 101 illustrated in FIG. 1. FIG. 5 is a current-voltage waveform chart of respective components in FIG. 4.

The resonant current ir has the sine wave-like waveform, and the both-end voltages vds1 and vds2 of the switching elements Q1 and Q2 have half sine wave-like waveforms for each half period to realize the ZVS operation.

As already described above, the first resonant frequency fra of the power transmission-side resonance mechanism is set to be lower than the switching frequency fs of the first and second switch circuits S1 and S2, and the second resonant frequency frb defined by the power transmission-side resonance mechanism and the capacitor of the first or second switch circuit is set to be higher than the switching frequency fs so as to satisfy fra<fs≤frb. To be specific, for example, equations of:

$$fra = 1/\sqrt{(LpCr)}$$

$$frb = 1/2\pi\sqrt{(LpCrCds/(Cr+Cds))}$$

are satisfied. Therefore, when the switching frequency fs is set to 6.78 MHz, values of the capacitors Cr and Cds are adjusted such that, for example, fra is 4 MHz and frb is 7 MHz. Note that in this example, Cds1=Cds2=Cds is satisfied.

Moreover, the first impedance Za when the load side is observed from both ends of one switch circuit with the resonance mechanism interposed therebetween in a state in which the other switch circuit is short-circuited without involving the capacitance of the one switch circuit and the second impedance Zb when the load side is observed from both ends of one switch circuit with the resonance mechanism interposed therebetween in a state in which the other switch circuit is short-circuited without involving the capacitance of the one switch circuit are adjusted to be the inductive impedance. The both-end voltages vds1 and vds2 of the switching elements Q1 and Q2 thereby have the half sine wave-like waveforms for each half period and the ZVS operation is realized.

Figure 6A:
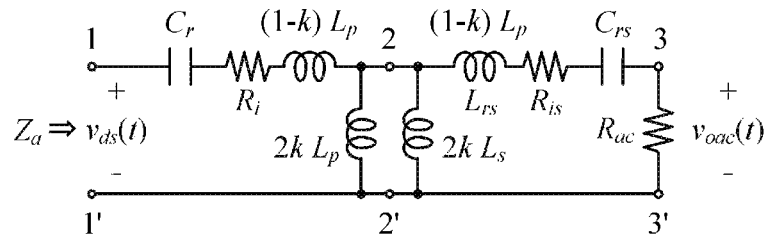
FIG. 6(A) is an equivalent circuit diagram illustrating a first impedance Za and FIG. 6(B) is an equivalent circuit diagram illustrating a second impedance Zb.
Figure 6B:
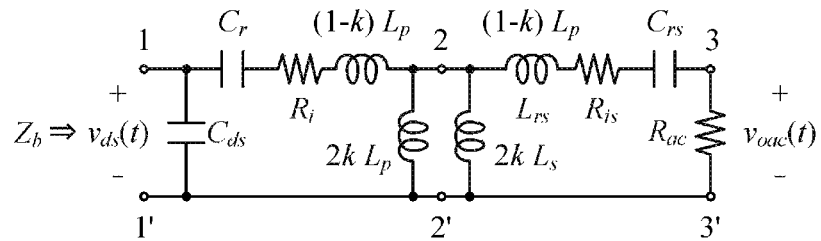

FIG. 6(A) is an equivalent circuit diagram illustrating the above-described first impedance Za and FIG. 6(B) is an equivalent circuit diagram illustrating the above-described second impedance Zb. Herein, k is a coefficient of coupling between the power transmission coil np and the power receiving coil ns, Ri is a resistance component of the power transmission-side resonance mechanism, and Ris is a resistance component of the power reception-side resonance mechanism. Rac is an AC load resistance.

Figure 7A:
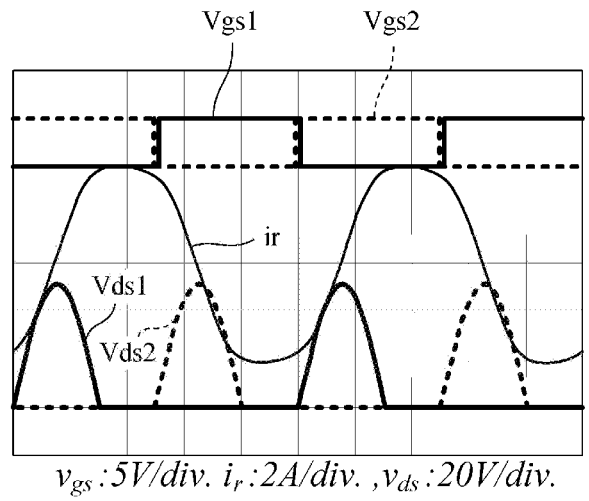
FIGS. 7(A), 7-(B), and 7(C) are voltage-current waveform charts under respective conditions of a switching frequency fs and resonant frequencies fra and frb.
Figure 7B:
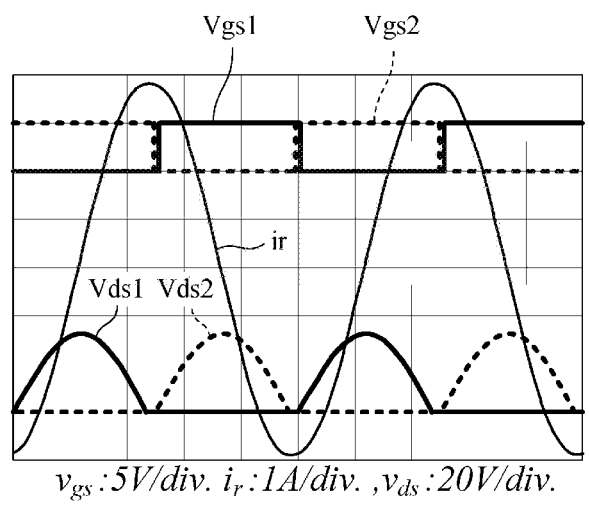
Figure 7C:
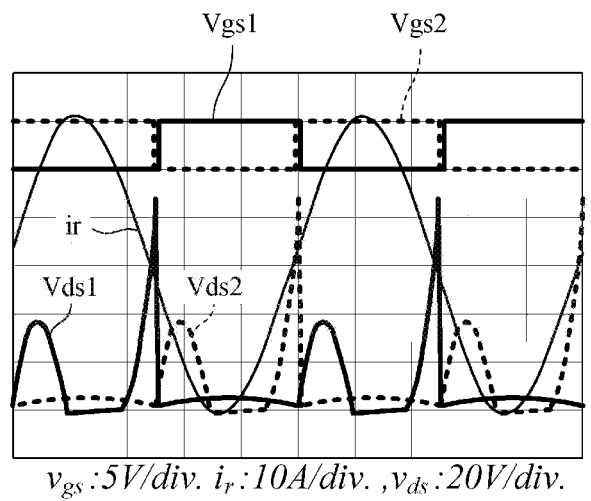

FIGS. 7(A), 7(B), and 7(C) illustrate operation waveforms under conditions of:

(A) fra=4 MHz, frb=9.5 MHz, Cds1=1.14 nF, Cds2=1.14 nF, and Cr=5.2 nF (B) fra=4 MHz, frb=6.78 MHz, Cds1=2.84 nF, Cds2=2.84 nF, and Cr=5.2 nF (C) fra=6.78 MHz, frb=8.7 MHz, Cds1=2.84 nF, Cds2=2.84 nF, and Cr=1.835 nF when the switching frequency fs is assumed to 6.78 MHz. FIG. 7(A) illustrates the waveform under the above-described condition (A), FIG. 7(B) illustrates the waveform under the above-described condition (B), and FIG. 7(C) illustrates the waveform under the above-described condition (C).

The condition (C) among the conditions (A), (B), and (C) does not satisfy the condition of the disclosure. Under the condition (C), the both-end voltages vds1 and vds2 of the switching elements Q1 and Q2 do not have the half sine wave-like waveforms for each half period and the ZVS operation is not realized. Under the condition (C), the amplitude of the resonant current ir is the largest and the electromagnetic field resonance largely occurs compared to the conditions (A) and (B). However, heat generation of the switching elements is large and power efficiency and reliability of the system are largely lowered because the ZVS operation is not realized.

On the other hand, the above-described conditions (A) and (B) satisfy the condition fra<fs≤frb of the disclosure. As is obvious from FIG. 7(A) and FIG. 7(B), the both-end voltages vds1 and vds2 of the switching elements Q1 and Q2 have the half sine wave-like waveforms for each half period and the ZVS operation is realized.

It should be noted that with the dual-transistor push-pull configuration as in the embodiment, one of the two switching elements Q1 and Q2 is always in the OFF state. Therefore, the equivalent circuit thereof is always equal to the equivalent circuit in the state illustrated in FIG. 6(B). A switching operation at a switching frequency around the second resonant frequency frb in this state can cause resonance to occur while realizing the ZVS operation, thereby achieving the ZVS operation closer to the optimum ZVS operation. Higher energy conversion efficiency and higher power conversion efficiency can be thereby provided. That is to say, this operation corresponds to an operation of FIG. 7(B).

In the principle of resonance, as the resonant frequency and the switching frequency are closer to each other, feeding power can be increased. To be specific, with the dual-transistor push-pull configuration, the feeding power can be controlled based on a magnitude of |fra−fs|. As |frb−fs| is smaller, the feeding power can be increased. In a range of satisfying fra<fs≤frb as the condition of the disclosure, as a value of |frb−fra| is smaller, the feeding power can be increased.

Figure 8A:
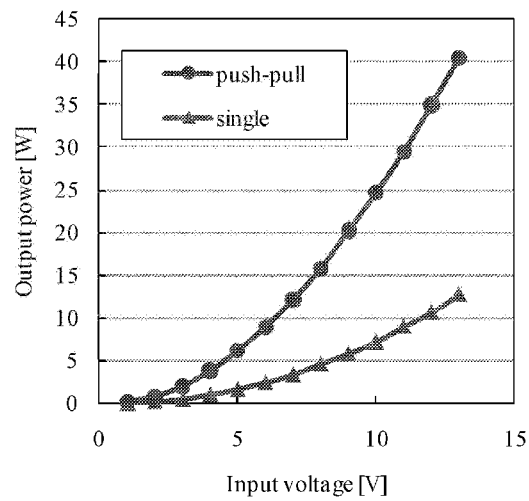
FIGS. 8(A), 8(B), and 8(C) are graphs for comparing characteristics with those of a single-transistor class-E power transmission unit that is described in a second embodiment.
Figure 8B:
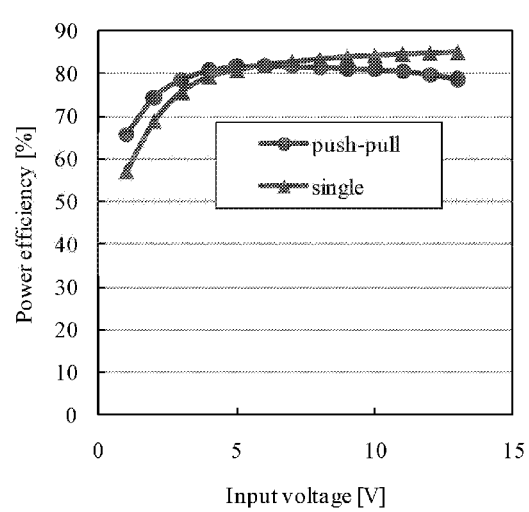
Figure 8C:
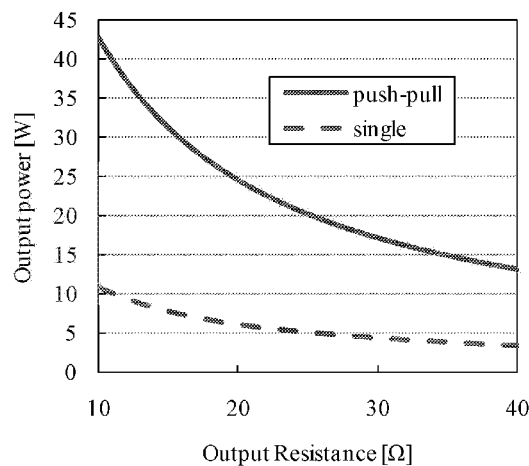

FIGS. 8(A), 8(B), and 8(C) are graphs for comparing characteristics with those of a single-transistor class-E power transmission unit that is described in a second embodiment. FIG. 8(A) illustrates characteristics of input voltage-to-output power, FIG. 8(B) illustrates a relation of power conversion efficiency with an input voltage, and FIG. 8(C) illustrates characteristics of output resistance-to-output power.

In FIGS. 8(A) and 8(B), a load resistance Ro is set to 20Ω and a voltage of the input power supply Vi is changed from 1 V to 13 V. FIG. 8(A) indicates that when Vi is 5 V, 10 V, and 13 V, Po is 6.18 W, 24.6 W, and 40.5 W, respectively, in the embodiment (push-pull class-E) whereas Po is 1.68 W, 7.23 W, and 12.8 W, respectively, in the case of the single-transistor class-E. Employment of the push-pull configuration provides the output power of 3.67-fold, 3.41-fold, and 3.17-fold higher than those in the case of the single-transistor class-E when Vi is 5 V, 10 V, and 13 V, respectively. In an experiment, when Vi is set to 5 V and the push-pull class-E is employed, the output power of almost 4-fold higher than that in the case of the single-transistor class-E is obtained. FIG. 8(B) indicates that when Vi is lower than 6 V, the power efficiency is higher in the case of push-pull class-E.

In FIG. 8(C), Vi is set to 10 V and the resistance Ro is changed from 15Ω to 40Ω. When Ro is set to 20Ω, an average value of absolute values of viac and the output power are 19.9 V and Po=24.6 W, respectively, in the case of the push-pull class-E whereas they are 9.99 V and Po=6.21 W, respectively, in the case of the single-transistor class-E. That is, the average value of the absolute values of viac is approximately 2-fold and the output power is approximately 4-fold higher in the case of the push-pull class-E.

The first embodiment provides the following effects.

(1) Electricity is fed beyond a space by causing the electromagnetic field resonance to occur using the DC voltage and the first and second switching elements achieves the ZVS operation to reduce power loss in the switching elements. The wireless power feeding system can be increased in efficiency, reduced in size and weight, and increased in reliability.

(2) The dual-transistor push-pull class-E configuration can provide electric power of approximately 4-fold higher than that with the single-transistor class-E configuration.

(3) The power feeding system that feeds electric power to a distanced place can be configured. The power feeding system can be configured extremely simply and a power feeding system apparatus can be reduced in size and weight.

(4) The electromagnetic field resonance occurring between the transmission-side and reception-side resonance mechanisms enables long-distance power feeding with higher power efficiency than that with the electromagnetic induction type power feeding.

(5) The power feeding is performed using not only the magnetic field resonance coupling formed between the power transmission coil and the power receiving coil but also the electric field resonance coupling, thereby supplying electric power with higher power efficiency than that in the case of power feeding using only the magnetic field resonance coupling.

(6) A leakage inductance which is not involved in the coupling in inductance components of the power transmission coil or the power receiving coil can be used as the inductor configuring the power transmission-side resonance mechanism or the power reception-side resonance mechanism. With this, no resonant inductor component is necessary, thereby reducing the power feeding system apparatus in size and weight.

(7) The power transmission coil np and the power receiving coil ns can form capacitors with electric field resonance to be used as the resonant capacitors. With this, no capacitor component is necessary, thereby achieving reduction in size and weight.

(8) The feeding power can be adjusted by detecting output, transmitting information to the power transmission side using a feedback circuit, and controlling the power transmission-side AC voltage generation circuit, thereby causing an electronic apparatus to operate appropriately.

(9) Iron loss of the coils is eliminated by configuring the power transmission coil and the power receiving coil by air-core coils, thereby performing wireless power feeding efficiently even at a high frequency.

Second Embodiment

Figure 9:
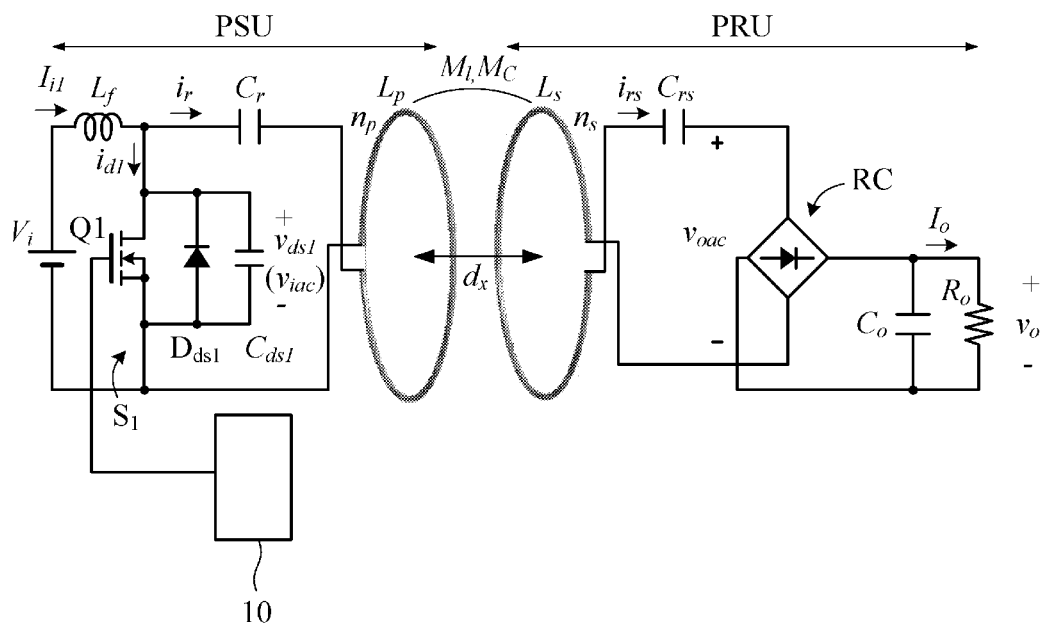
FIG. 9 is a circuit diagram of a wireless power feeding system 102 according to the second embodiment.

FIG. 9 is a circuit diagram of a wireless power feeding system 102 according to the second embodiment.

The wireless power feeding system 102 is configured by the power transmission unit PSU and the power receiving unit PRU. Although the power transmission unit PSU employs the dual-transistor class-E push-pull type in the first embodiment, the power transmission unit PSU in the second embodiment employs a single-transistor class-E switching power supply type.

The power transmission unit PSU includes the power transmission-side resonance mechanism configured by the power transmission coil np and the power transmission-side resonant capacitor Cr, the first power transmission-side AC current generation circuit which is electrically connected to the power transmission-side resonance mechanism, and the switching control circuit 10.

The first power transmission-side AC current generation circuit includes the first switch circuit S1 which is equivalently configured by the parallel connection circuit of the switching element Q1, the diode Dds1, and the capacitor Cds1, and the first inductor Lf1 having an inductance which generates, from the input DC voltage, the current source capable of being regarded as the DC current relatively to the AC current flowing through the power transmission-side resonance mechanism.

Figure 10:
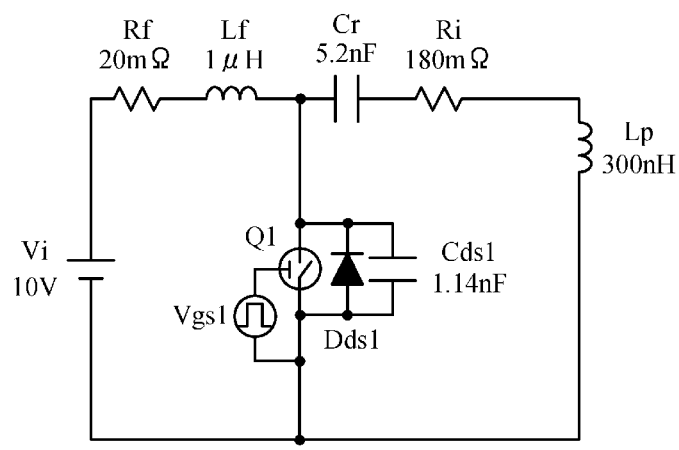
FIG. 10 is a simulation circuit of the wireless power feeding system 102 illustrated in FIG. 9.
Figure 11A:
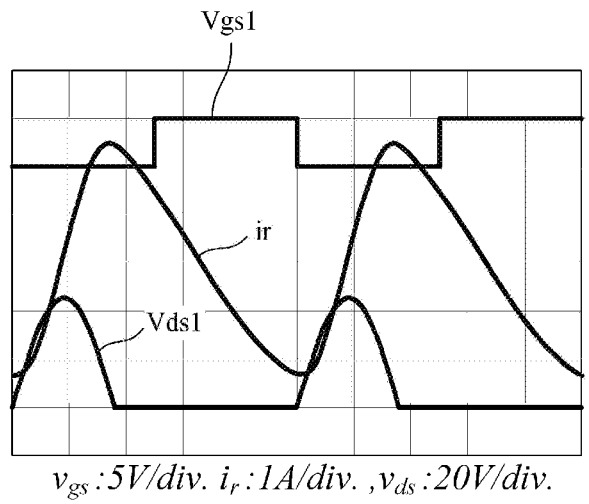
FIGS. 11(A), 11(B), and 11(C) are current-voltage waveform charts of respective components in FIG. 10.
Figure 11B:
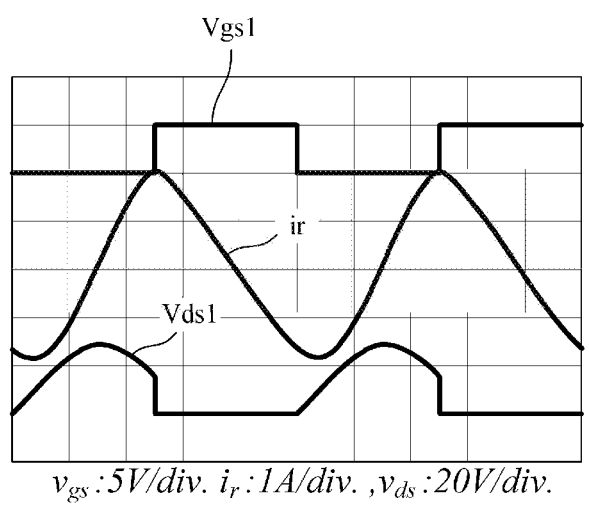
Figure 11C:
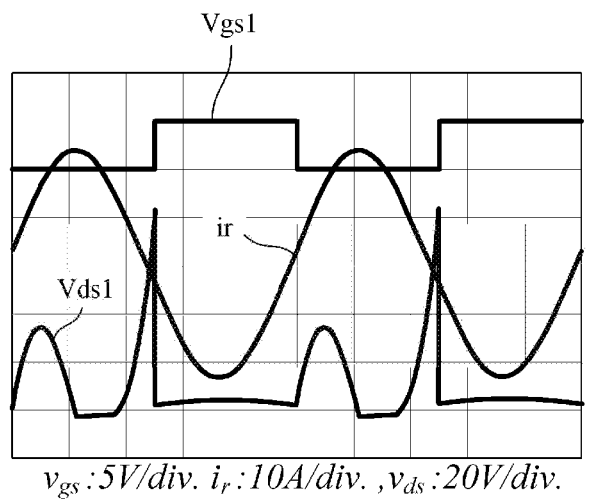

FIG. 10 is a simulation circuit of the wireless power feeding system 102 illustrated in FIG. 9. FIG. 11 is a current-voltage waveform chart of respective components in FIG. 10.

The resonant current ir has a sine wave-like waveform, and the both-end voltage vds1 of the switching element Q1 has a half sine wave-like waveform for each half period to realize the ZVS operation.

As already described above, the first resonant frequency fra of the power transmission-side resonance mechanism is set to be lower than the switching frequency fs of the first switch circuit S1, and the second resonant frequency frb defined by the power transmission-side resonance mechanism and the capacitor of the first switch circuit S1 is set to be higher than the switching frequency fs to satisfy fra<fs≤frb. To be specific, for example, equations of:

$$fra = 1/\sqrt{(LpCr)}$$

$$frb = 1/2\pi\sqrt{(LpCrCds1/(Cr+Cds1))}$$

are satisfied. Therefore, when the switching frequency fs is set to 6.78 MHz, values of the capacitors Cr and Cds1 are adjusted such that, for example, fra is 4 MHz and frb is 7 MHz.

Moreover, the first impedance Za when the load side is observed from both ends of the first switch circuit S1 with the resonance mechanism interposed therebetween without involving the capacitance of the first switch circuit S1 and the second impedance Zb when the load side is observed from both ends of the first switch circuit S1 with the resonance mechanism interposed therebetween without involving the capacitance of the first switch circuit S1 are adjusted to be the inductive impedance. The both-end voltages vds1 of the switching elements Q1 thereby have the half sine wave-like waveforms for each half period and the ZVS operation is realized.

Equivalent circuit diagrams illustrating the above-described first impedances Za and Zb are as illustrated in FIG. 6 in the first embodiment.

FIG. 11 illustrates operation waveforms under conditions of:

(A) fra=4 MHz, frb=9.5 MHz, Cds1=1.14 nF, and Cr=5.2 nF (B) fra=4 MHz, frb=6.78 MHz, Cds1=2.84 nF, and Cr=5.2 nF (C) fra=6.78 MHz, frb=8.7 MHz, Cds1=2.84 nF, and Cr=1.835 nF when the switching frequency fs is assumed to be 6.78 MHz.

The condition (C) among the conditions (A), (B), and (C) does not satisfy the condition of the disclosure. Under the condition (C), the both-end voltage vds1 of the switching element Q1 does not have the half sine wave-like waveform for each half period and the ZVS operation is not realized. Under the condition (C), the amplitude of the resonant current ir is the largest and the electromagnetic field resonance largely occurs compared to the conditions (A) and (B). However, heat generation of the switching element is large and power efficiency and reliability of the system are largely lowered because the ZVS operation is not realized.

On the other hand, the above-described conditions (A) and (B) satisfy the condition fra<fs≤frb of the disclosure. As is obvious from FIG. 11, under the above-described condition (A), the both-end voltage vds1 of the switching element Q1 has the half sine wave-like waveform for each half period and the ZVS operation is realized. Under the above-described condition (B), although it is hard to mention that the complete ZVS operation is realized, switching loss in the switching element is sufficiently smaller than that under the above-described condition (C) and an operation in accordance with the ZVS operation is realized (zero voltage switching).

Third Embodiment

Figure 12:
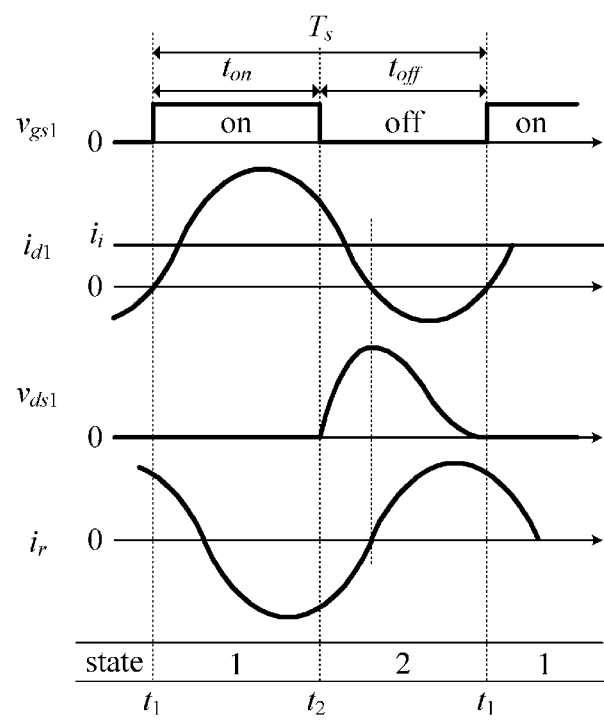
FIG. 12 is a voltage-current waveform chart of respective components of a wireless power feeding system according to a third embodiment.

FIG. 12 is a voltage-current waveform chart of respective components of a wireless power feeding system according to a third embodiment. The circuit configuration is as described in the second embodiment.

Operations in respective states in the switching period are described below with reference to FIG. 12.

(a) State 1 (t1≤t<t2)

At the power transmission unit side, the switching element Q1 is conducted and a flowing current id1 starts to flow from 0 A and becomes a positive current. A resonant current flows through the power transmission coil np and the resonant capacitor Cr and the power receiving coil ns and the resonant capacitor Crs.

At the power receiving unit side, the resonant current is rectified and the rectified and smoothened current is supplied to the load for power transmission. When the switching element Q1 is turned OFF, a state 2 is established.

(b) State 2 (t2≤t<t1)

The capacitor Cds1 at both ends of the switching element Q1 starts to resonate, is first charged, and performs discharging when the voltage exceeds a peak voltage. The voltage vds1 gradually approaches to 0 V and when the switching element Q1 is turned ON, the state 2 is ended.

The state 1 and the state 2 are periodically repeated hereinafter.

In this manner, the voltage vds gradually approaches to 0 V immediately before the switching element Q1 is turned ON and the current id1 starts to flow from 0 A at the timing at which the switching element Q1 is turned ON. The switching element Q1 performs the ZVS operation, thereby largely reducing switching loss and switching noise. Furthermore, conduction loss is also reduced because the diode Dds1 of the switch circuit S1 is not conducted. As a result, the power efficiency of the wireless power feeding system can be increased.

Fourth Embodiment

Figure 13:
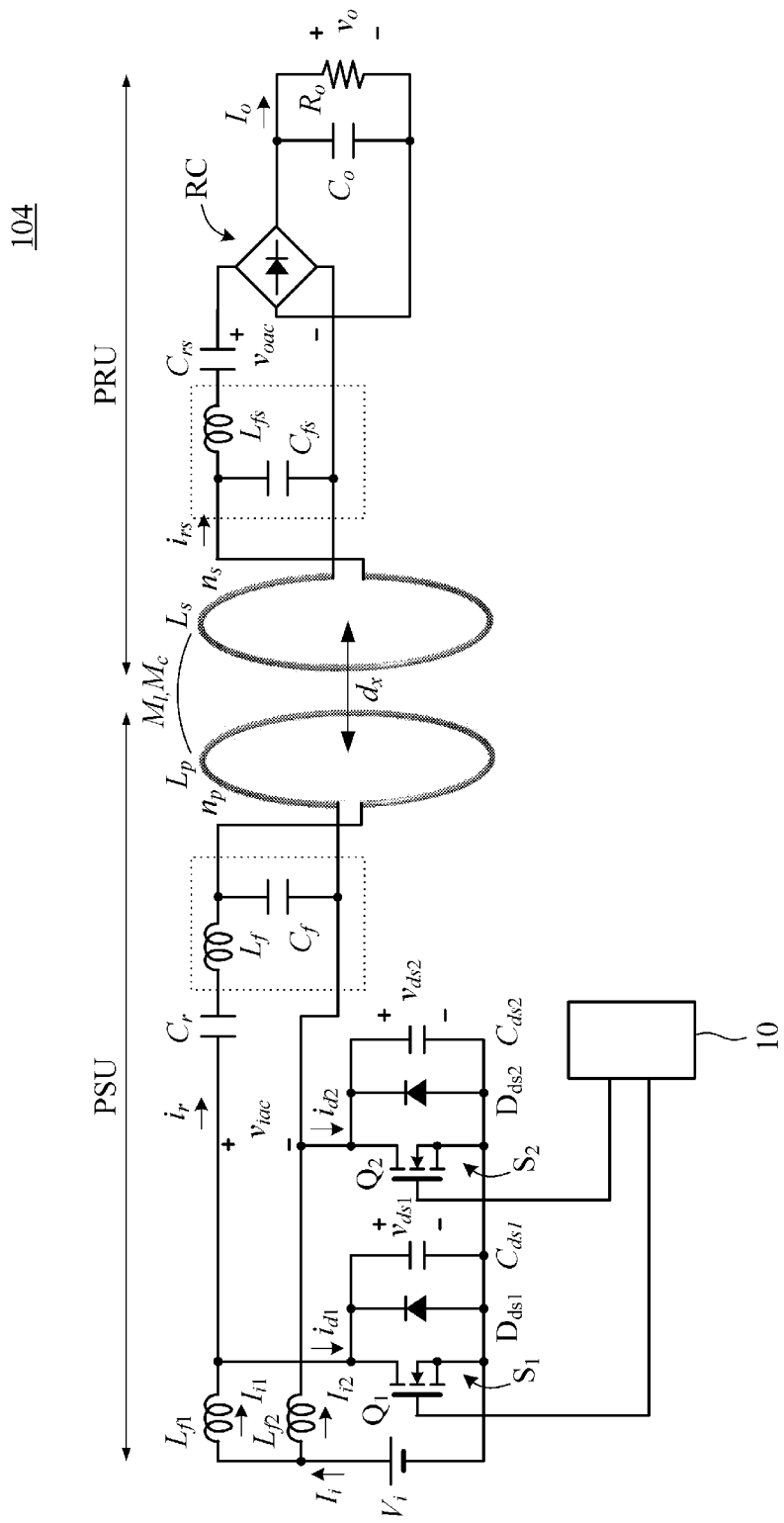
FIG. 13 is a circuit diagram of a wireless power feeding system 104 according to a fourth embodiment.

FIG. 13 is a circuit diagram of a wireless power feeding system 104 according to a fourth embodiment.

The wireless power feeding system 104 is configured by the power transmission unit PSU and the power receiving unit PRU.

In the embodiment, a first filter including an inductor element Lfp and a capacitor element Cfp is provided between the power transmission-side AC voltage generation circuits and the power transmission-side resonance mechanism. Furthermore, a second filter including an inductor element Lfs and a capacitor element Cfs is provided between the power reception-side resonance mechanism and the rectifying circuit. Other configurations are the same as those described in the first embodiment.

Both of the first filter and the second filter function as low pass filters. Cut-off frequencies of these low pass filters are defined such that harmonic current components in a waveform of a current flowing through the resonance mechanisms are reduced. Provision of the filters can reduce the harmonic current components in the waveform of the current flowing through the resonance mechanisms, thereby reducing EMI noise. Therefore, EMC with other electronic apparatuses can be enhanced. For example, crosstalk with a wireless communication apparatus and the like can be suppressed. In addition, the filters can convert the impedances of the resonance mechanisms. That is to say, impedance matching can be achieved. This enables a current and a voltage appropriate for the load to be supplied.

Fifth Embodiment

Figure 14:
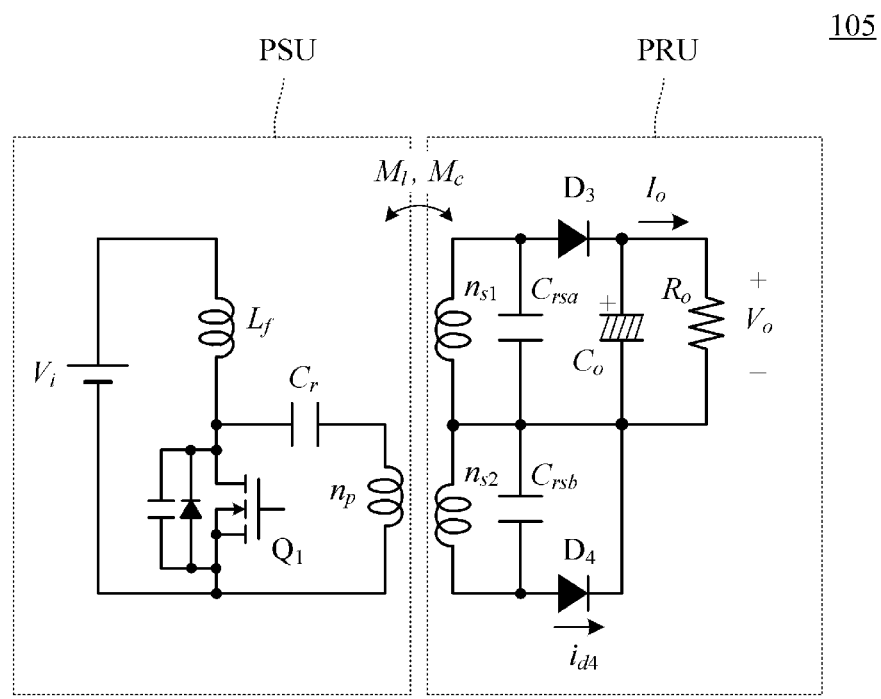
FIG. 14 is a circuit diagram of a wireless power feeding system 105 according to a fifth embodiment.

FIG. 14 is a circuit diagram of a wireless power feeding system 105 according to a fifth embodiment. The wireless power feeding system 105 is different from the wireless power feeding system illustrated in FIG. 1 in the first embodiment in the configuration at the power receiving unit PRU side. In the fifth embodiment, a center tap rectifying circuit is configured by power receiving coils ns1 and ns2, diodes D3 and D4, and the capacitor Co. The configuration at the power transmission unit PSU is the same as that described in the first embodiment.

In the fifth embodiment, at the power receiving unit PRU side, stray capacitances generated in the power receiving coils ns1 and ns2 or capacitors alone configure resonant capacitors Crsa and Crsb (capacitors corresponding to Crs in FIG. 1).

The wireless power feeding system 105 can disperse loss at the power receiving unit side by using the two power receiving coils ns1 and ns2 and the two rectifying diodes D3 and D4, thereby reducing power loss. Furthermore, the number of rectifiers is smaller than that in bridge rectification. Moreover, the parallel resonance circuit is configured at the power receiving unit side, thereby increasing voltage gain in comparison with the case in which a series resonance circuit is configured.

Sixth Embodiment

Figure 15:
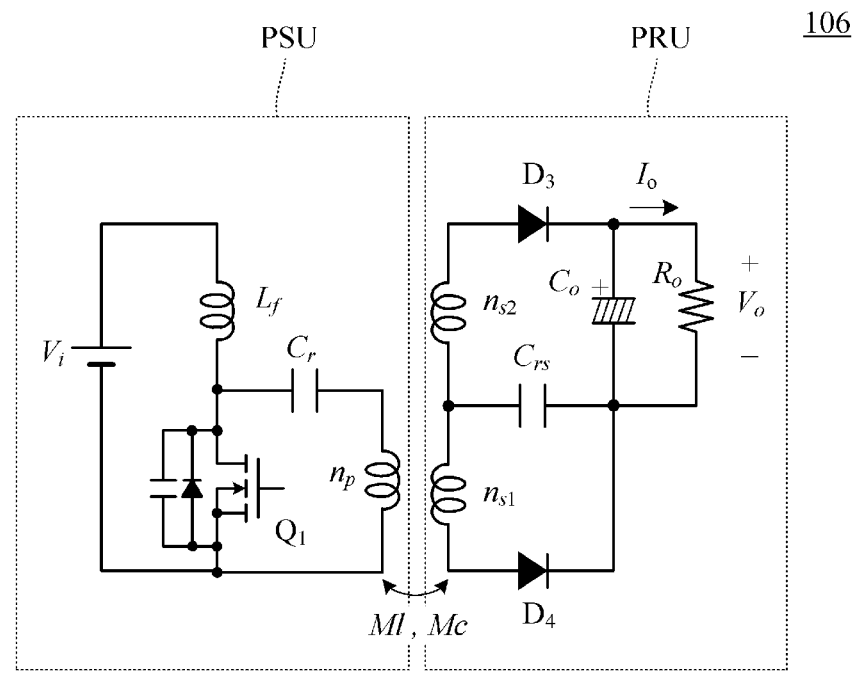
FIG. 15 is a circuit diagram of a wireless power feeding system 106 according to a sixth embodiment.

FIG. 15 is a circuit diagram of a wireless power feeding system 106 according to a sixth embodiment. In this example, a series resonant capacitor Crs is provided at the power receiving unit PRU side unlike the wireless power feeding system illustrated in FIG. 14 in the fifth embodiment. The series resonance circuit is configured at the power receiving unit side in this manner, thereby increasing current gain in comparison with the case in which the parallel resonance circuit is configured.

Seventh Embodiment

Figure 16:
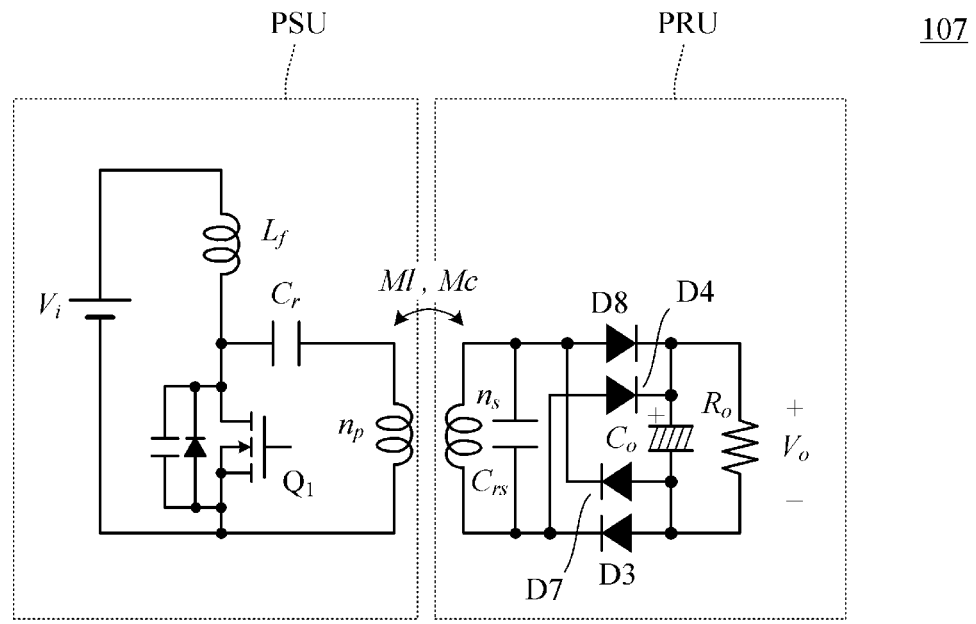
FIG. 16 is a circuit diagram of a wireless power feeding system 107 according to a seventh embodiment.

FIG. 16 is a circuit diagram of a wireless power feeding system 107 according to a seventh embodiment. The wireless power feeding system 107 is different from the wireless power feeding system illustrated in FIG. 1 in the first embodiment in the configuration at the power receiving unit PRU side. In the seventh embodiment, a bridge rectifying circuit configured by diodes D3, D4, D7, and D8 and the capacitor Co is connected to the power receiving coil ns. The configuration of the power transmission unit PSU is the same as that described in the first embodiment.

At the power receiving unit PRU side, a stray capacitance generated in the power receiving coil ns or a capacitor alone configures a resonant capacitor Crs (capacitor corresponding to Crs in FIG. 1).

The wireless power feeding system 107 in the seventh embodiment can decrease the breakdown voltage of the rectifying element in comparison with the current transmission system illustrated in FIG. 15 in the sixth embodiment. Furthermore, the parallel resonance circuit is configured at the power receiving unit side, thereby increasing voltage gain in comparison with the case in which the series resonance circuit is configured.

Eighth Embodiment

Figure 17:
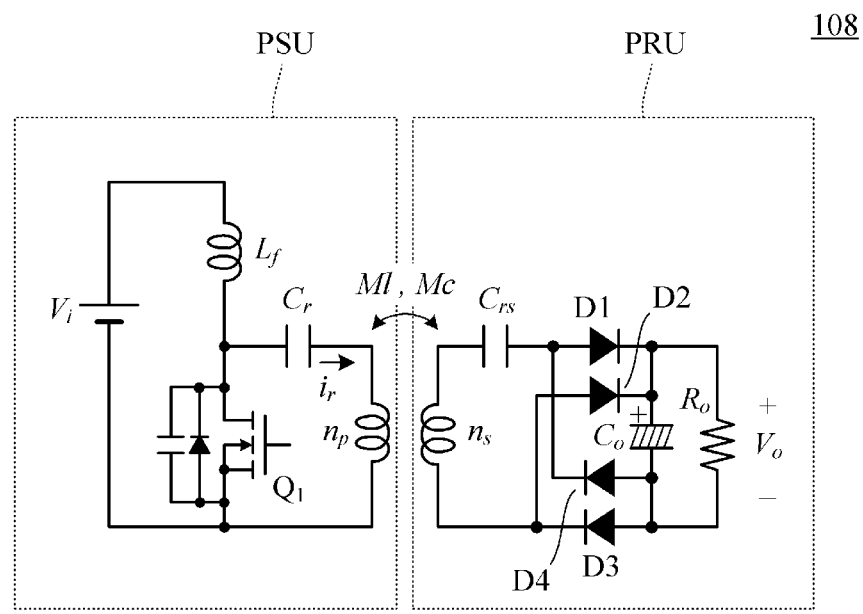
FIG. 17 is a circuit diagram of a wireless power feeding system 108 according to an eighth embodiment.

FIG. 17 is a circuit diagram of a wireless power feeding system 108 according to an eighth embodiment. The wireless power feeding system 108 is different from the wireless power feeding system illustrated in FIG. 16 in the seventh embodiment in a position of the resonant capacitor Crs.

Therefore, the capacitor Crs can cause the electromagnetic field resonance operation to be performed at a predetermined resonant frequency.

In the wireless power feeding system 108 in the eighth embodiment, the series resonance circuit is configured at the power receiving unit side in this manner, thereby increasing current gain in comparison with the case in which the parallel resonance circuit is configured.

Ninth Embodiment

Figure 18:
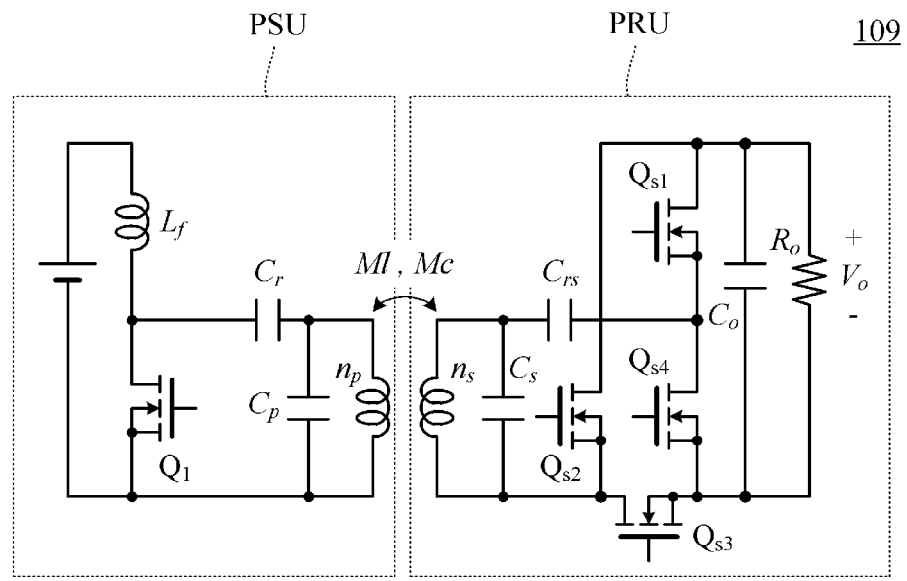
FIG. 18 is a circuit diagram of a wireless power feeding system 109 according to a ninth embodiment.

FIG. 18 is a circuit diagram of a wireless power feeding system 109 according to a ninth embodiment. In this example, a synchronous rectifying circuit having a bridge rectification configuration by four switching elements Qs1, Qs2, Qs3, and Qs4 is provided at the power receiving unit PRU side. Furthermore, a capacitor Cp is equivalently configured at both ends of the power transmission coil np and a capacitor Cs is equivalently configured at both ends of the power receiving coil ns.

With the ninth embodiment, a voltage that is applied to each of the switching elements Qs1, Qs2, Qs3, and Qs4 at the power receiving unit PRU side is decreased to half, thereby reducing loss in the switching elements in comparison with the first to eighth embodiments.

The wireless power feeding system 109 can reduce rectification loss with the synchronous rectifying circuit in comparison with that in the wireless power feeding system described in the eighth embodiment. Furthermore, the bridge configuration enables the breakdown voltages of the rectifying switching elements to be decreased. In addition, the rectifying circuit is configured by the switching elements, thereby performing bidirectional wireless power feeding. Moreover, an electromagnetic resonance operation can be performed at a predetermined resonant frequency using the resonant capacitor Crs.

Tenth Embodiment

Figure 19:
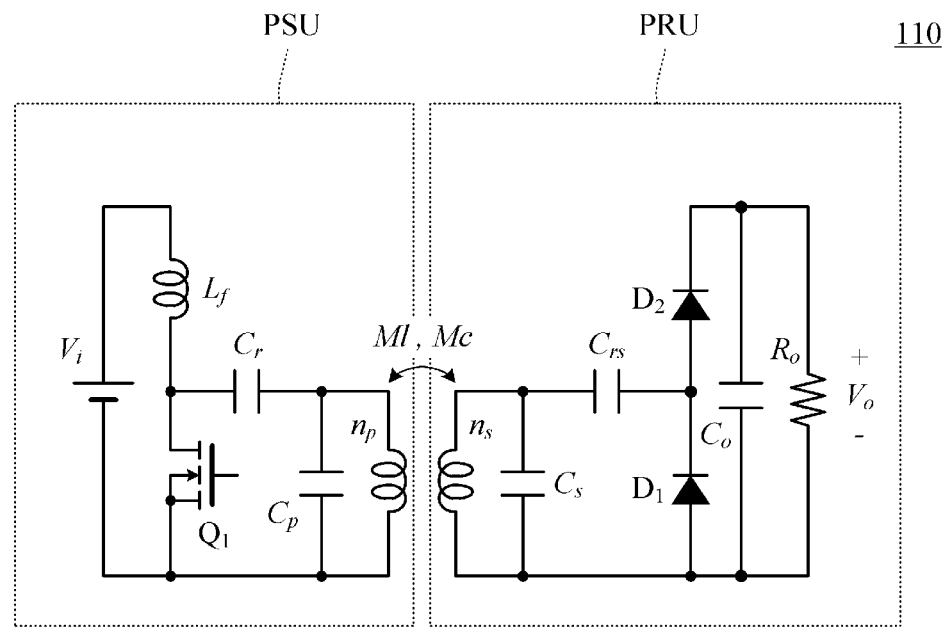
FIG. 19 is a circuit diagram of a wireless power feeding system 110 according to a tenth embodiment.

FIG. 19 is a circuit diagram of a wireless power feeding system 110 according to a tenth embodiment. In this example, a rectifying circuit configured by two diodes D1 and D2 is provided at the power receiving unit PRU side.

With the tenth embodiment, the configuration at the power receiving unit PRU side can be made more simple than that in the ninth embodiment. Furthermore, the rectifying circuit is a passive circuit, thereby eliminating the necessity to provide a circuit for driving the rectifying circuit.

Eleventh Embodiment

Figure 20:
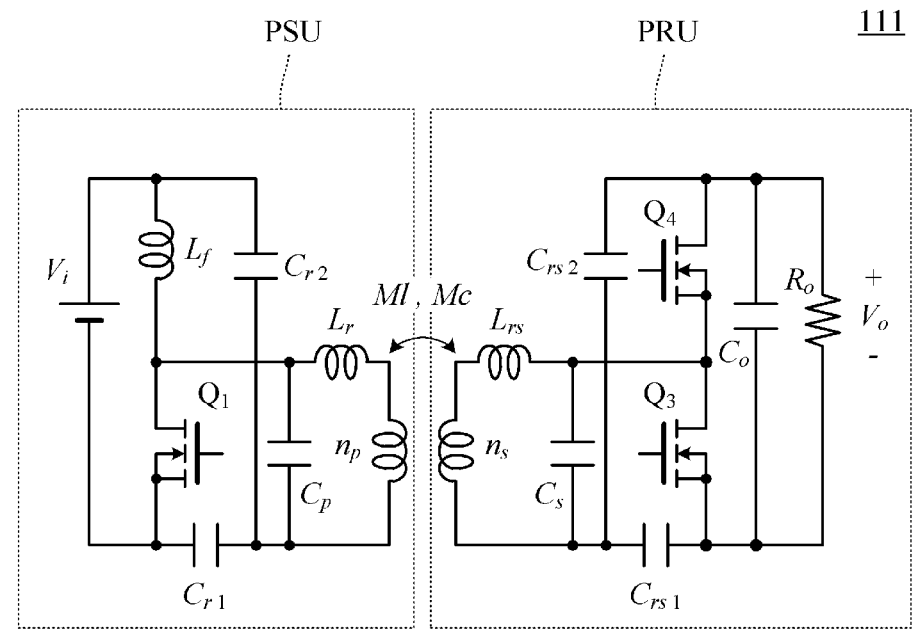
FIG. 20 is a circuit diagram of a wireless power feeding system 111 according to an eleventh embodiment.

FIG. 20 is a circuit diagram of a wireless power feeding system 111 according to an eleventh embodiment.

In this example, capacitors Cr1 and Cr2 dividing the voltage of the input power supply Vi and capacitors Crs1 and Crs2 dividing the output voltage Vo are provided. That is to say, the resonant capacitor Cr in the wireless power feeding system described in the first embodiment is divided into Cr1 and Cr2 and the resonant capacitor Crs therein is divided into Crs1 and Crs2. Herein, leakage inductances of the power transmission coil np and the power receiving coil ns are obviously illustrated as resonant inductors Lr and Lrs, respectively. A synchronous rectifying circuit configured by switching elements Q3 and Q4 is provided in the power receiving unit PRU.

In the eleventh embodiment, a current flowing through the resonant capacitor is divided into the two capacitors. Therefore, power loss in the capacitor is dispersed to reduce overall loss, and heat generation is dispersed. Furthermore, a desired resonant frequency can be set by using a plurality of resonant capacitors, thereby performing a resonance operation easily.

The capacitors Cr1 and Cr2 and the capacitors Crs1 and Crs2 function to hold the DC voltage and block the DC current and serve as series resonant capacitors. Furthermore, the equivalent capacitor Cp at both ends of the power transmission coil np and the equivalent capacitor Cs at both ends of the power receiving coil ns are also illustrated.

Twelfth Embodiment

Figure 21:
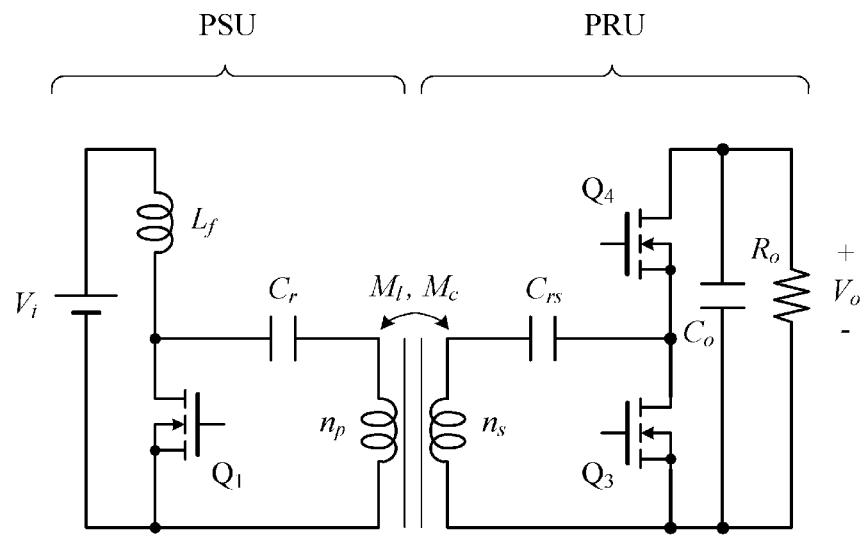
FIG. 21 is a circuit diagram of a wireless power feeding system 112 according to a twelfth embodiment.

FIG. 21 is a circuit diagram of a wireless power feeding system 112 according to a twelfth embodiment. In this example, a magnetic material such as ferrite is used for a magnetic path forming the electromagnetic field resonance coupling.

In the wireless power feeding system 112 illustrated in FIG. 21, the degree of the magnetic coupling is increased by using the magnetic material, thereby increasing the power transmission efficiency. Furthermore, electromagnetic waves (magnetic flux and electric flux) that are released to a space can be suppressed with ferrite.

Thirteenth Embodiment

Figure 22:
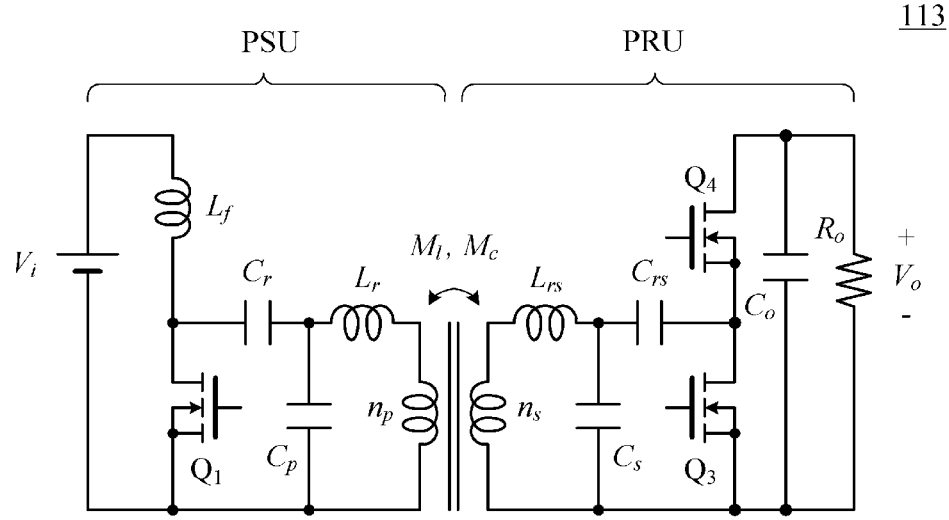
FIG. 22 is a circuit diagram of a wireless power feeding system 113 according to a thirteenth embodiment.

FIG. 22 is a circuit diagram of a wireless power feeding system 113 according to a thirteenth embodiment. In this example, a magnetic material such as ferrite is used for a magnetic path forming the electromagnetic field resonance coupling. Also in this example, the degree of magnetic coupling is increased by using the magnetic material, thereby increasing the power transmission efficiency. Furthermore, electromagnetic waves (magnetic flux and electric flux) that are released to a space can be suppressed with ferrite.

Fourteenth Embodiment

Figure 23:
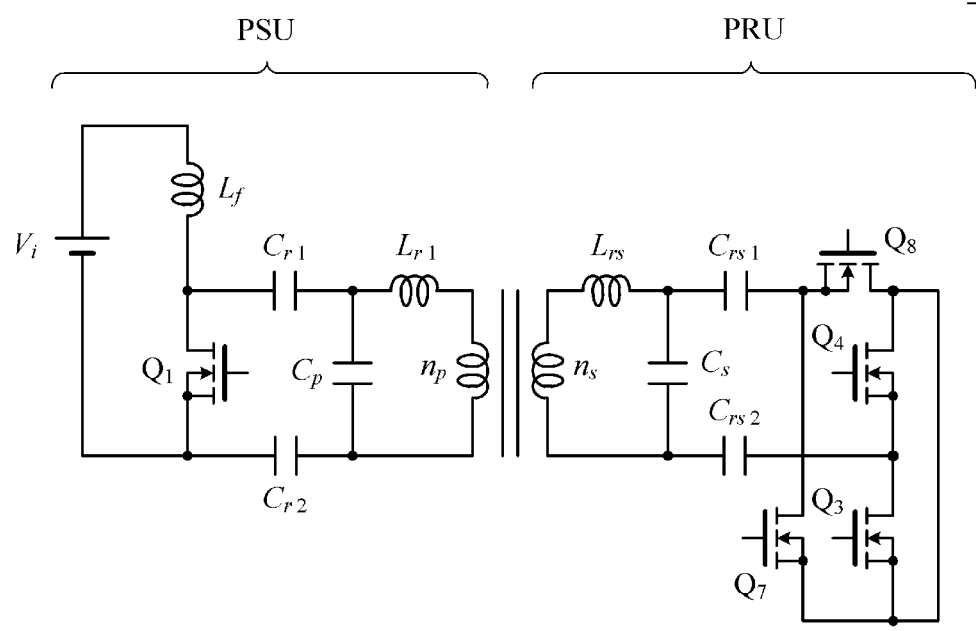
FIG. 23 is a circuit diagram of a wireless power feeding system 114 according to a fourteenth embodiment.

FIG. 23 is a circuit diagram of a wireless power feeding system 114 according to a fourteenth embodiment. In this example, two resonant capacitors Cr1 and Cr2 are provided in the power transmission unit PSU and two resonant capacitors Crs1 and Crs2 are provided in the power receiving unit PRU. Furthermore, a synchronous rectifying circuit having a bridge rectification configuration by four switching elements Qs1, Qs2, Qs3, and Qs4 is provided at the power receiving unit PRU side.

In the wireless power feeding system 114, the power transmission coil np of the power transmission unit PSU and the power receiving coil ns of the power receiving unit PRU are formed as coils having magnetic cores made of ferrite or the like. Therefore, the degree of the magnetic coupling is increased by using the magnetic material, thereby increasing the power transmission efficiency. Furthermore, electromagnetic waves (magnetic flux and electric flux) that are released to a space can be suppressed.

Fifteenth Embodiment

Figure 24:
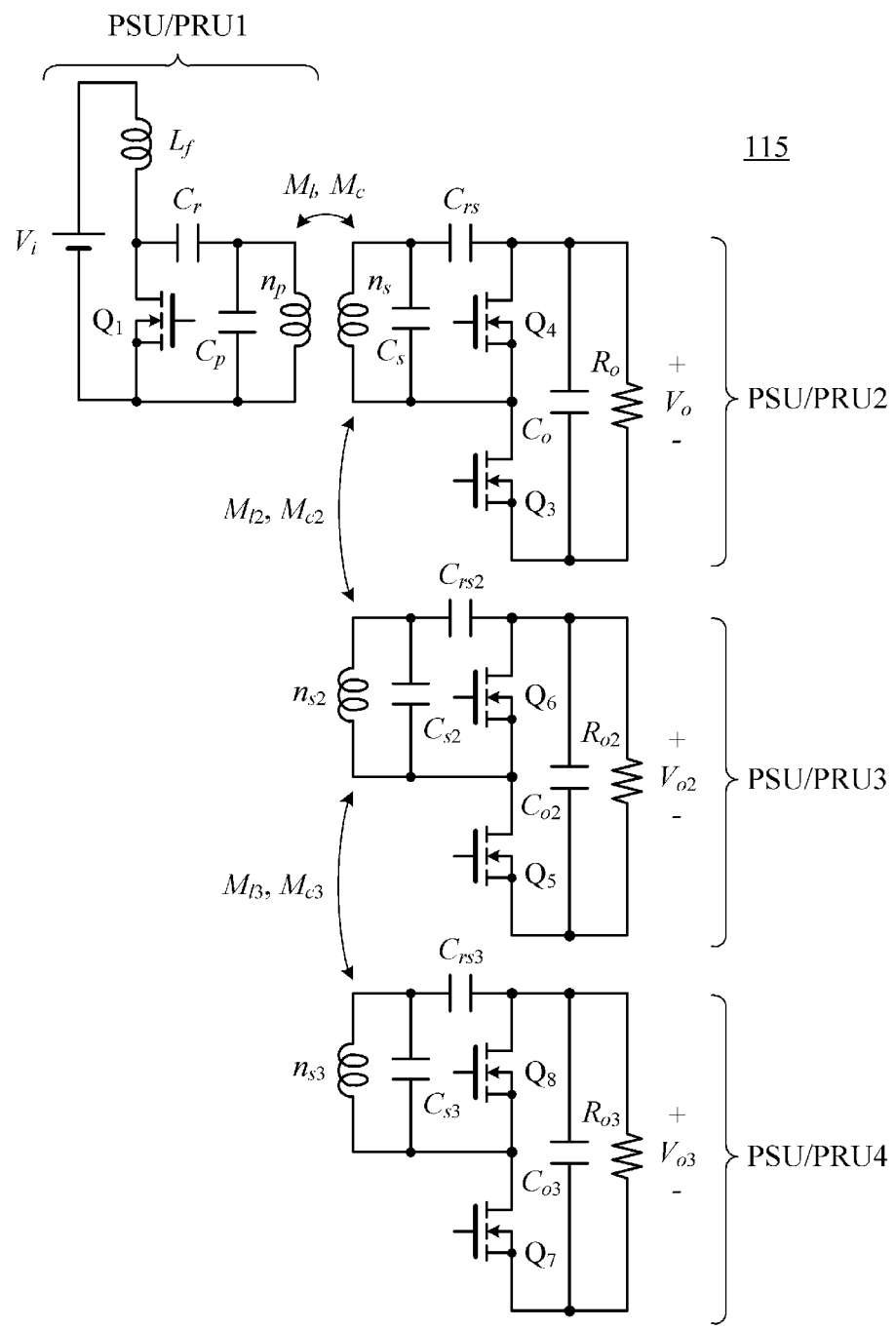
FIG. 24 is a circuit diagram of a wireless power feeding system 115 according to a fifteenth embodiment.

FIG. 24 is a circuit diagram of a wireless power feeding system 115 according to a fifteenth embodiment.

The wireless power feeding system 115 is a system including a plurality of power transmission/receiving units PSU/PRU1, PSU/PRU2, PSU/PRU3, and PSU/PRU4 capable of performing bidirectional wireless power feeding.

When the first power transmission/receiving unit PSU/PRU1 functions as a power transmission unit, the second power transmission/receiving unit PSU/PRU2 forming electromagnetic field resonance coupling with the first power transmission/receiving unit PSU/PRU1 functions as a power receiving unit. Accordingly, electric power is transmitted to the second power transmission/receiving unit PSU/PRU2 from the first power transmission/receiving unit PSU/PRU1. The load Ro of the second power transmission/receiving unit PSU/PRU2 includes a charging battery and a charging circuit thereof.

The third power transmission/receiving unit PSU/PRU3 corresponds to the second power transmission/receiving unit PSU/PRU2. When the second power transmission/receiving unit PSU/PRU2 functions as the power transmission unit, the power transmission/receiving unit PSU/PRU3 functions as the power receiving unit. In this case, the second power transmission/receiving unit PSU/PRU2 uses the charging battery as a power supply. A load Ro2 of the third power transmission/receiving unit PSU/PRU3 includes a charging battery and a charging circuit thereof.

The fourth power transmission/receiving unit PSU/PRU4 corresponds to the third power transmission/receiving unit PSU/PRU3. When the third power transmission/receiving unit PSU/PRU3 functions as the power transmission unit, the fourth power transmission/receiving unit PSU/PRU4 functions as the power receiving unit. In this case, the third power transmission/receiving unit PSU/PRU3 uses the charging battery as a power supply. A load Ro3 of the fourth power transmission/receiving unit PSU/PRU4 includes a charging battery and a charging circuit thereof.

In this manner, the plurality of power transmission/receiving units are provided, thereby enabling the transmitting electric power to a distanced place while the power transmission/receiving units relay the electric power.

When resonant frequencies of resonance circuits of the plurality of power receiving units are made different and the power transmission units side are configured to perform switching operations at the switching frequency in accordance with power transmission destinations, electric power can be selectively transmitted to a predetermined power receiving unit among the plurality of power receiving units.

Furthermore, electric power can be transmitted to a direction (place) suitable for the purpose for each switching frequency by switching the switching frequency in accordance with the power transmission direction of the power transmission/receiving unit. That is to say, control of switching the switching frequency and so on is performed enabling to select an appropriate electronic apparatus and feed electric power to an appropriate direction and an appropriate place.

Sixteenth Embodiment

Figure 25:
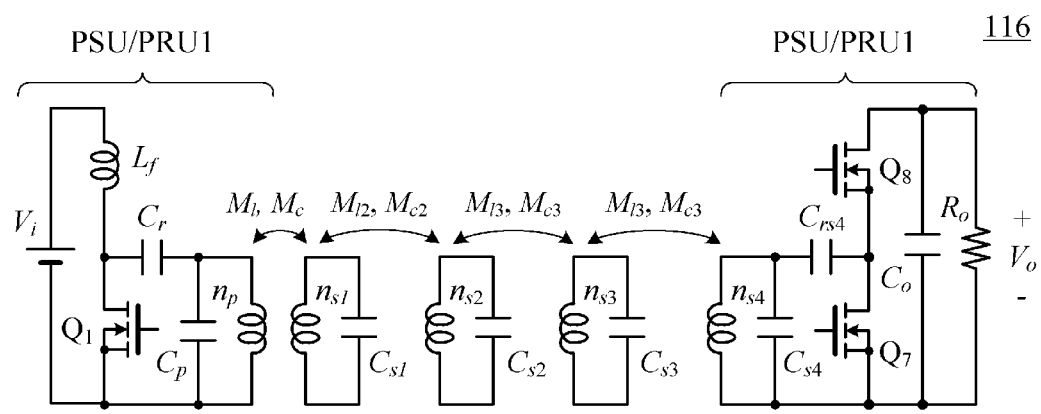
FIG. 25 is a circuit diagram of a wireless power feeding system 116 according to a sixteenth embodiment.

FIG. 25 is a circuit diagram of a wireless power feeding system 116 according to a sixteenth embodiment. In this example, a plurality of resonators are installed between the power transmission coil np and a power receiving coil ns4. In FIG. 25, a first relay LC resonance circuit is configured by a power receiving coil (inductor) ns1 and a capacitor Cs1, a second relay LC resonance circuit is configured by a power receiving coil (inductor) ns2 and a capacitor Cs2, and a third relay LC resonance circuit is configured by a power receiving coil (inductor) ns3 and a capacitor Cs3.

Electromagnetic field resonance coupling is formed while involving the plurality of resonators by installing the plurality of resonators in this manner and the resonators are installed with predetermined intervals enabling to supply electric power to a farther place. Furthermore, electric power can be fed to the farther place with high power transmission efficiency.

Seventeenth Embodiment

In a wireless power feeding system 117 according to a seventeenth embodiment, the power transmission unit PSU and the power receiving unit PRU have symmetric properties. Furthermore, a communication function is provided between the power transmission unit PSU and the power receiving unit PRU.

Figure 26:
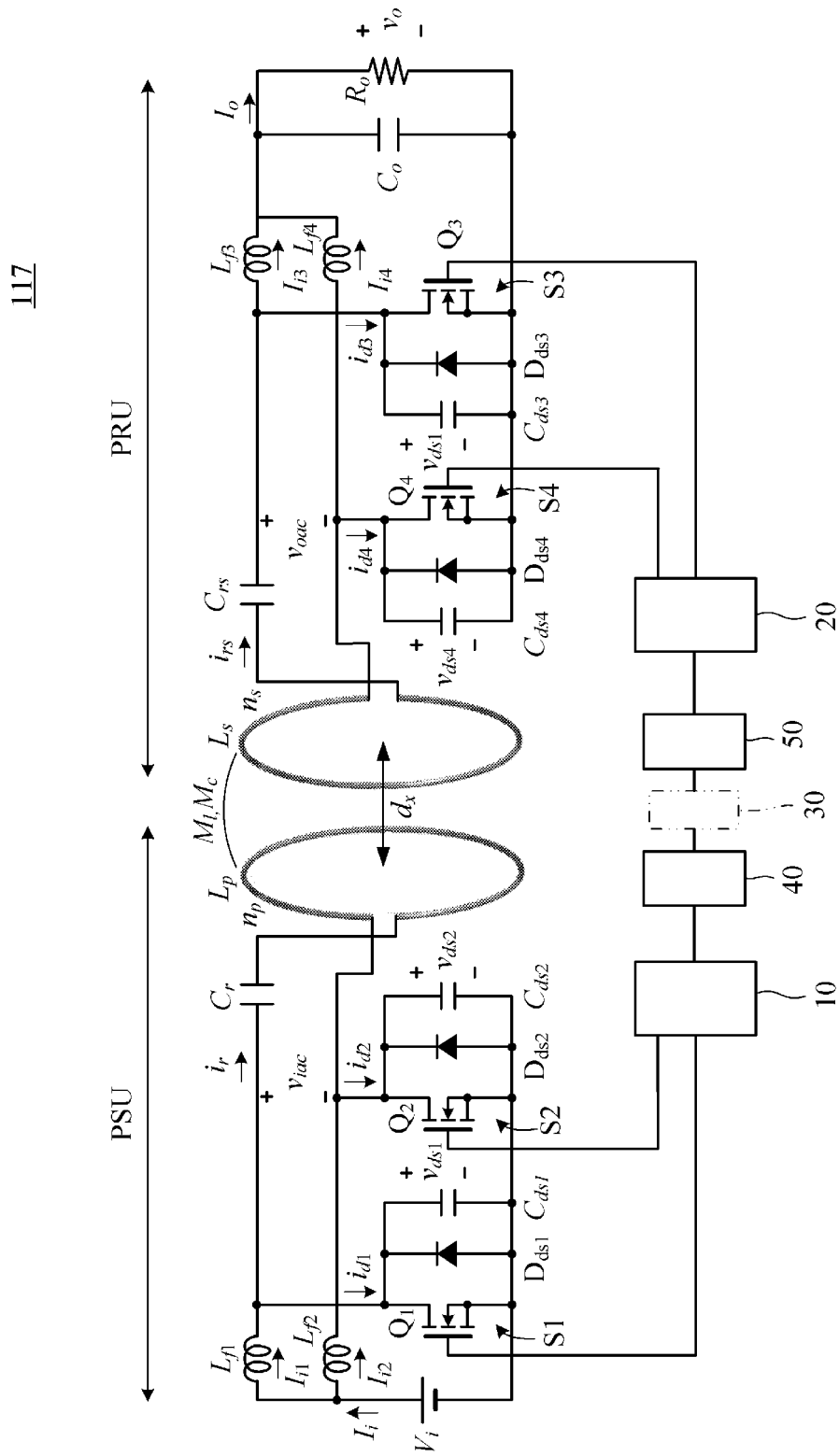
FIG. 26 is a circuit diagram of a wireless power feeding system 117 according to a seventeenth embodiment.

FIG. 26 is a circuit diagram of the wireless power feeding system 117 according to the seventeenth embodiment.

A switching control circuit 20 detects output information (a voltage, a current, electric power, or the like that is output to the load Ro) and transmits feedback information to the power transmission unit PSU side with a power reception-side communication circuit 50 interposed therebetween. The power transmission-side communication circuit 40 controls the power transmission-side AC voltage generation circuits (switch circuits S1 and S2) based on the output information received from the power reception-side communication circuit 50 with a signal transmission unit 30 interposed therebetween to control feeding power. The switching control circuit 20, the power reception-side communication circuit 50, the signal transmission unit 30, and the like operate with electric power (output voltage Vo) received by the power receiving unit PRU.

The above-described power reception-side communication circuit 50 is an example of an "output information transmission circuit" according to the disclosure. The power transmission-side communication circuit 40 is an example of an "output information receiving circuit".

A voltage and a current suitable for the load can be supplied by controlling the feeding power based on the information fed back from the power receiving unit in this manner.

The power transmission-side communication circuit 40 transmits control timing signals for the switching elements Q1 and Q2 to the power reception-side communication circuit 50. The switching control circuit 20 switches the switching elements Q3 and Q4 in synchronization with the timing signals to perform synchronous rectification control.

The above-described signal transmission unit 30 transmits the output information to the power transmission unit side using, for example, a wireless communication circuit. Moreover, the above-described signal transmission unit 30 converts an output signal into an optical signal to transmit, and converts the optical signal into an electric signal (reception signal). With this configuration, the feeding power can be adjusted at the power transmission unit side in an electrically insulated state.

In the wireless power feeding system 117 in the embodiment, the power transmission unit PSU and the power receiving unit PRU are circuits having the same configuration and have symmetric properties. Therefore, the wireless power feeding system 117 can be used as a bidirectional wireless power feeding system apparatus. That is to say, the power reception-side rectifying circuits (S3 and S4) receive electric power from an output portion and function as power transmission-side AC voltage generation circuits by switching whereas the power transmission-side AC voltage generation circuits (S1 and S2) receive electric power from the output portion and function as power reception-side rectifying circuits by switching.

Thus, bidirectional power feeding can be performed. Electric power can be fed to the power transmission unit PSU side from the power receiving unit PRU side, and received electric power can be fed to another place while the power receiving unit PRU side is used as a relay point. Furthermore, the wireless power feeding system can also be used as a relay system and a long-distance power feeding can be performed while the plurality of apparatuses are prepared for relay.

The invention claimed is:

1. A wireless power feeding system comprising
a power transmission unit including a power transmission coil and a power receiving unit including a power receiving coil, and feeds electric power to the power receiving unit from the power transmission unit, wherein
the power transmission unit includes a power transmission-side resonant capacitor configuring a power transmission-side resonance mechanism together with the power transmission coil, a first power transmission-side alternating-current (AC) current generation circuit which is electrically connected to one side of the power transmission-side resonance mechanism, a second power transmission-side AC current generation circuit which is electrically connected to the other side of the power transmission resonance mechanism, and a switching control circuit,
the first power transmission-side AC current generation circuit includes a first switch circuit which is equivalently configured by a parallel connection circuit of a switching element, a diode, and a capacitor, and a first inductor having an inductance which generates, from an input DC voltage, a first current source capable of being regarded as a DC current relatively to an AC current flowing through the power transmission-side resonance mechanism,
the second power transmission-side AC current generation circuit includes a second switch circuit which is equivalently configured by a parallel connection circuit of a switching element, a diode, and a capacitor, and a second inductor having an inductance which generates, from the input DC voltage, a second current source capable of being regarded as a DC current relatively to an AC current flowing through the power transmission-side resonance mechanism,
the switching control circuit generates the AC current in the power transmission coil from the first power transmission-side AC voltage generation circuit and the second power transmission-side AC voltage generation circuit by alternately turning ON and OFF the switching element of the first switch circuit and the switching element of the second switch circuit,
the power receiving unit includes a power receiving-side resonant capacitor configuring a power receiving-side resonance mechanism together with the power receiving coil, and a power receiving-side rectifying circuit which is electrically connected to the power receiving coil and rectifies an AC current generated in the power receiving coil,
a first resonant frequency which is determined by the power transmission-side resonance mechanism is lower than a switching frequency of the first switch circuit and the second switch circuit,
a second resonant frequency which is determined by the power transmission-side resonance mechanism and the capacitor of the first switch circuit or the second switch circuit is higher than or equal to the switching frequency,
the switching control circuit switches the switching elements of the first switch circuit and the second switch circuit at a switching frequency at which a first impedance when a load side is observed from both ends of one switch circuit of the first switch circuit and the second switch circuit with the power transmission-side resonance mechanism interposed therebetween in a state in which the other switch circuit is short-circuited without involving a capacitance of the one switch circuit is an inductive impedance and switches the switching elements of the first switch circuit and the second switch circuit at a switching frequency at which a second impedance when the load side is observed from both ends of one switch circuit of the first switch circuit and the second switch circuit with the power transmission-side resonance mechanism interposed therebetween in a state in which the other switch circuit is short-circuited while involving the capacitance of the one switch circuit is an inductive impedance to make each of both-end voltages of the first switch circuit and the second switch circuit have a half sine wave-like waveform for each half period, and
an equivalent electromagnetic field resonance coupling circuit is configured by a mutual inductance or a mutual capacitance which is equivalently formed between the power transmission coil and the power receiving coil to cause the power transmission-side resonance mechanism and the power receiving-side resonance mechanism to resonate.

2. The wireless power feeding system according to claim 1, wherein
the power transmission-side resonance mechanism includes the switching control circuit which makes the first switch circuit or the second switch circuit into conduction after a both-end voltage of the first switch circuit or the second switch circuit from the power transmission coil becomes around 0 V.

3. The wireless power feeding system according to claim 2, wherein
the second resonant frequency is set so as to be equal to the switching frequency.

4. The wireless power feeding system according to claim 2, wherein
the first resonant frequency fra and the second resonant frequency frb are set for the switching frequency fs so as to substantially satisfy (fra+frb)/2=fs.

5. The wireless power feeding system according to claim 1, including a filter having an inductor element and a capacitor element between the power transmission-side AC voltage generation circuit and the power transmission-side resonance mechanism.

6. The wireless power feeding system according to claim 1, including a filter having an inductor element and a capacitor element between the power receiving-side resonance mechanism and the rectifying circuit.

7. The wireless power feeding system according to claim 1, wherein
the power receiving unit includes an output information transmission circuit which detects output information related to output of the power receiving unit side rectifying circuit and transmits the output information to the power transmission unit, and the power transmission unit includes an output information receiving circuit which receives the output information and the control circuit which controls the power transmission-side AC voltage generation circuit in accordance with the output information to control feeding power.

8. The wireless power feeding system according to claim 7,
wherein the output information transmission circuit is a circuit which transmits the output information by wireless communication and the output information receiving circuit is a circuit which receives the output information by wireless communication.

9. The wireless power feeding system according to claim 7,
wherein the output information transmission circuit is a circuit which converts an electric signal into an optical signal to transmit the output information, and the output information receiving circuit is a circuit which converts the optical signal into the electric signal to receive the output information.

10. The wireless power feeding system according to claim 1,
wherein the switching control circuit controls electric power which is fed to the power receiving unit from the power transmission unit by frequency modulation PFM control of changing the switching frequency.

11. The wireless power feeding system according to claim 1,
wherein the switching control circuit controls electric power which is fed to the power receiving unit from the power transmission unit by PWM control of controlling a time ratio at a constant switching frequency.

12. The wireless power feeding system according to claim 1, wherein
the power receiving-side rectifying circuit is a synchronous rectifying circuit including a switching element.

13. The wireless power feeding system according to claim 12,
wherein the power receiving unit includes an operation frequency control circuit which controls an operation frequency of the synchronous rectifying circuit.

14. The wireless power feeding system according to claim 1,
wherein the power receiving unit includes a power receiving unit-side control circuit which controls a circuit at the power receiving unit side and the power receiving unit-side control circuit operates with electric power received by the power receiving unit.

15. The wireless power feeding system according to claim 1, wherein
the power receiving-side rectifying circuit receives electric power from an output portion of the power receiving-side rectifying circuit and functions as the power transmission-side AC voltage generation circuit, and the power transmission-side AC voltage generation circuit receives electric power from the output portion and functions as the power receiving-side rectifying circuit.

16. The wireless power feeding system according to claim 1,
wherein the power transmission coil and the power receiving coil are formed by air-core coils.

17. The wireless power feeding system according to claim 1,
wherein the mutual inductance is an equivalent excitation inductance which is generated by magnetic field resonance coupling formed between the power transmission coil and the power receiving coil.

18. The wireless power feeding system according to claim 1, wherein
the power transmission-side resonance mechanism or the power receiving-side resonance mechanism includes an inductor, and the inductor is a leakage inductance component which is not involved in coupling in inductance components of the power transmission coil or the power receiving coil.

19. The wireless power feeding system according to claim 1, including a single or a plurality of resonance devices which have resonance mechanisms and configure an electromagnetic field resonance coupling circuit together with the power transmission unit and the power receiving unit.

20. A wireless power feeding system comprising
a power transmission unit including a power transmission coil and a power receiving unit including a power receiving coil, and feeds electric power to the power receiving unit from the power transmission unit, wherein the power transmission unit includes a power transmission-side resonant capacitor configuring a power transmission-side resonance mechanism together with the power transmission coil, a first power transmission-side AC current generation circuit which is electrically connected to the power transmission-side resonance mechanism, and a switching control circuit, the first power transmission-side AC current generation circuit includes a first switch circuit which is equivalently configured by a parallel connection circuit of a switching element, a diode, and a capacitor, and a first inductor having an inductance which generates, from an input DC voltage, a current source capable of being regarded as a DC current relatively to an AC current flowing through the power transmission-side resonance mechanism, the switching control circuit generates the AC current in the power transmission coil from the power transmission-side AC voltage generation circuit by turning ON and OFF the switching element of the first switch circuit, the power receiving unit includes a power receiving-side resonant capacitor configuring a power receiving-side resonance mechanism together with the power receiving coil, and a power receiving-side rectifying circuit which is connected to the power receiving coil and rectifies an AC current generated in the power receiving coil, a first resonant frequency which is determined by the power transmission-side resonance mechanism is lower than a switching frequency of the first switch circuit, a second resonant frequency which is determined by the power transmission-side resonance mechanism and the capacitor of the first switch circuit is higher than the switching frequency, the switching control circuit switches the switching element at a switching frequency at which a first impedance when a load side is observed from both ends of the first switch circuit with the power transmission-side resonance mechanism interposed therebetween without involving a capacitance of the first switch circuit is an inductive impedance and switches the switching element at a switching frequency at which a second impedance when the load side is observed from both ends of the first switch circuit with the power transmission-side resonance mechanism interposed therebetween while involving the capacitance of the first switch circuit is an inductive impedance to make a both-end voltage of the first switch circuit have a half sine wave-like waveform for each half period, and an electromagnetic field resonance coupling circuit is configured by a mutual inductance or a mutual capacitance which is equivalently formed between the power transmission coil and the power receiving coil to cause the power transmission-side resonance mechanism and the power receiving-side resonance mechanism to resonate.

21. The wireless power feeding system according to claim 20, wherein the power transmission-side resonance mechanism includes the switching control circuit which makes the first switch circuit into conduction after a both-end voltage of the first switch circuit from the power transmission coil becomes around 0 V.

* * * * *